(12) United States Patent
Wood et al.

(10) Patent No.: US 11,178,050 B2
(45) Date of Patent: Nov. 16, 2021

(54) NEURAL NETWORK FOR SECURE DATA TRANSPORT, SYSTEM AND METHOD

(71) Applicants: Samuel Frederick Wood, Los Altos Hills, CA (US); Samuel Bennett Wood, Los Altos Hills, CA (US)

(72) Inventors: Samuel Frederick Wood, Los Altos Hills, CA (US); Samuel Bennett Wood, Los Altos Hills, CA (US)

( * ) Notice: Subject to any disclaimer, the term of this patent is extended or adjusted under 35 U.S.C. 154(b) by 30 days.

(21) Appl. No.: 16/602,527

(22) Filed: Oct. 23, 2019

(65) Prior Publication Data

US 2020/0106703 A1 Apr. 2, 2020

Related U.S. Application Data

(63) Continuation-in-part of application No. 15/530,345, filed on Dec. 28, 2016, now Pat. No. 10,462,039, which is a continuation-in-part of application No. 14/019,309, filed on Sep. 5, 2013, now Pat. No. 9,542,642, which is a continuation-in-part of application No. 12/856,564, filed on Aug. 13, 2010, now Pat. No. 8,547,981, which is a continuation of application No. 11/696,077, filed on Apr. 3, 2007, now Pat. No. 7,796,511.

(60) Provisional application No. 60/790,430, filed on Apr. 6, 2006.

(51) Int. Cl.
*H04L 12/715* (2013.01)
*H04L 12/723* (2013.01)

(52) U.S. Cl.
CPC .............. *H04L 45/50* (2013.01); *H04L 45/04* (2013.01)

(58) Field of Classification Search
None
See application file for complete search history.

(56) References Cited

U.S. PATENT DOCUMENTS 7,191,178 B1 * 3/2007 Phoha ................. H04L 67/1008

* cited by examiner

*Primary Examiner* — Sithu Ko
*Assistant Examiner* — Emmanuel K Maglo

(57) ABSTRACT

This application discloses a neural network that also functions as a secure packet data network using an MPLS-type label switching technology. The neural network uses its intelligence to build and manage label switched paths (LSPs) to securely transport user packets and solve complex mathematical problems. This architecture is well suited to interconnect large numbers of processors or computers into a secure neural network exhibiting advanced intelligence which can be used for complex activities such as managing the power grid. However, the methods taught here can be applied to other data networks including ad-hoc, mobile, Information Centric, Content Centric, Sensor, and traditional IP packet networks, cell or frame-switched networks, time-slot networks and the like.

8 Claims, 24 Drawing Sheets

System Block Diagram
Switch Fabric Node

User Packet (Transmit Module)

Setup Packet (Transmit Module)

Teardown Packet (Recieve Module)

Teardown Packet (Transmit Module)

User Packet

User Packet

Address:  Label

Fig. 20

```
0              19 21       31              47                63
| Label      |0|0| TTL    |    Payload    |    Payload       |
```

Hunting Packet

Address:  PSN

Fig. 21

```
0              19 21       31         43      47              63
| PSN        |1|1| TTL    |    QOS   |V|W|X|Y|  Policy        |
| RCV. Node  | Req. Code  |  Pk./Av. BW.    | XMT Node        |
|            Info. Request                                    |
|            Key 1                                            |
|            Key 2                                            |
```

Setup Packet

Address:  PSN

Fig. 22

```
0              19 21       31         43      47              63
| PSN        |1|0| TTL    |    QOS   |V|W|X|Y|  Policy        |
| Label | Old TTL         | Pk./Av. BW.     | XMT Node        |
```

Teardown Packet

Address:  Label

Fig. 23

```
0              19 21       31         43      47              63
| Label      |0|1| TTL    |    QOS   |V|W|X|Y| Failed Node    |
```

Notes: V,W = Reserved    X = Address Type    0 = PSN    1 = Label
                                  Y = Direction        0 = FWD    1 = REV

Label Translation Table (FRD)

Address: Old Label

Fig. 24

| 0 | 19 | 31 | 41 | 59 | 63 |
|---|---|---|---|---|---|
| New Label | QOS | TTL | Ext. TTL | Output Port | |

PSN Reference Table

Address: PSN

Fig. 25

| 0 | 9 | 31 | 41 | 59 | 63 |
|---|---|---|---|---|---|
| Old TTL | Old Ext. TTL | New TTL | New Ext. TTL | Input Port | |

Label Translation Table (REV)

Address: New Label

Fig. 26

| 0 | 19 | 31 | 41 | 59 | 63 |
|---|---|---|---|---|---|
| Old Label | Pk./Av. BW. | TTL | Ext. TTL | Input Port | |

BranchTable

Address: Old Label

Fig. 27

| 0 | 19 | 23 | 43 | 47 | 59 | 63 |
|---|---|---|---|---|---|---|
| New Label | Port. | New Label 2 | Port | New Label 3 | Port | |

Output Port FlagTable

Address: Old Label

Fig. 28

| 0 | 1 | 3 | 7 | 15 |
|---|---|---|---|---|
| X | | | | |

X=1 to send packet to Flagged Port

McCulloch-Pitts model of a neuron.

$$y = \theta\left(\sum_{j=1}^{n} w_j x_j - u\right)$$

US 11,178,050 B2

NEURAL NETWORK FOR SECURE DATA TRANSPORT, SYSTEM AND METHOD

CROSS REFERENCE TO RELATED APPLICATIONS

This application is a continuation-in-part of application Ser. No. 15/530,345, filed Dec. 28, 2016 which is incorporated herein by reference, and is a continuation-in-part of application Ser. No. 14/019,309, filed Sep. 5, 2013, now U.S. Pat. No. 9,542,642, which is incorporated herein by reference, and is a continuation-in-part of application Ser. No. 12/856,564, filed Aug. 13, 2010, now U.S. Pat. No. 8,547,981, which is a continuation of application Ser. No. 11/696,077, filed Apr. 3, 2007, now U.S. Pat. No. 7,796,511, which is incorporated herein by reference, and which claims the benefit of U.S. Provisional Application 60/790,430, filed Apr. 6, 2006, which is also incorporated herein by reference.

FIELD OF THE INVENTION

The field of this invention is the intersection of the artificial intelligence field, specifically neural networks, with the data networks field, including data networks using label switching such as MPLS. However, the methods taught here can be applied to other data networks including ad-hoc, mobile, Information Centric, Content Centric, Sensor, and traditional IP packet networks, cell or frame-switched networks, time-slot networks and the like.

BACKGROUND OF THE INVENTION

Open Systems Interconnection (OSI) layers are known to those of skill in the art as a series of protocol layers to define communications in data networks. The first layer relates to the physical aspects of communication. Examples are T-1 and 100-base T. The second layer is called the data link layer. This layer is used to format data passing over a given link. Examples include Ethernet and HDLC. Layer 3 is called the network layer. This layer supports end-to-end packet delivery and the most common example is the IP routing in the Internet. Layer 4, the transport layer, provides end-to-end management of communications.

Networks that use a connection as the primary method of transporting information between two points are considered Layer 4 networks as Layer 4 protocols such as TCP can manage connections directly.

To improve the efficiency of packet networks, label-switching technologies such as frame relay, ATM, and MPLS have become popular for OSI layer 2 wide area networking. The short labels are popular with telecommunication carriers as a more efficient alternative to traditional IP routing. The most popular of these technologies, multi-protocol label switching (MPLS), uses label switched paths "LSPs" to carry packet flows between edge nodes. Packets in these flows are transported in a deterministic, orderly manner. In fact, transport schemes of this nature are so reliable that the term "pseudo wire" has been used to describe this system. Through the use of MPLS, packet flows through LSPs have been used to interconnect LANS (VLANS), support QOS and policy routing, and even switch synchronous services such as DS1s or DS3s. These networks fall short as they rely on the use of an IP address. The use of an IP address makes these networks fundamentally insecure as these addresses must not be encrypted as they are used for routing the packets. In addition, these addresses are often linked to a geographical location, which allow third parties such as hackers to easily identify packet flows. What is needed is a data network which is fundamentally secure and does not rely on addresses known to others.

Neural networks occur naturally and provide the intelligence of the human brain. Artificial Neural Networks (ANNs) are man-made networks used to solve complex problems. Details of these networks are described in the following documents which are incorporated herein by reference:

Reference 1

Anil K. Jain and Jianchang Mao and K. M. Mohiuddin "*Artificial Neural Networks: A Tutorial,*" Computer, March, 1996, pp. 31-44. (available online)

Reference 2

Vipan Kakkar "*Comparative Study on Analog and Digital Neural Networks*" International Journal of Science and Network Security, VOL. 9 No. 7, July 2009, pp. 14-21. (available online)

These two references will aid in providing the reader with the background necessary to understand the neural network aspects of this invention.

Many applications for ANNs exist. An important application lies in the control of the power grid. As this area is complex, a third reference is added.

Reference 3: U.S. Pat. No. 9,465,397 B2, Forbes

This reference will aid the reader in understanding the complex nature of the power grid, an excellent application for an ANN, and therefore is also incorporated herein by reference.

ANNs and data communication networks have always been treated separately as the requirements and resultant functionality has always been different. ANNs have traditionally been analog networks carrying voltages that are multiplied using analog multipliers to achieve the neural network weighting functions. As these neurons contain no addressing capability, they require a physical connection for communication, and can only communicate with their immediate neighbors. Lately, developers have been using software simulation to build neural networks. These neural networks rely on their host computers which are serial devices and therefore slow compared with true parallel neural networks. What is needed is a neural network technology that is fundamentally secure, and can share the connectivity benefits of today's packet networks.

RELATED ART

Today's OSI Layer 3 packet networks use distance oriented routing protocols such as OSPF to determine routing trees or to build new paths. These protocols use computers that are part of the routers or nodes to collect and process the data needed to make the routing decisions. Unlike the network of this application, the IP networks themselves possess no intelligence capable of performing any of the routing decisions, and must rely on external computers. The computers form a routing tree to determine a path through multiple nodes. Once determined, this information is flooded to all the nodes so each node can forward its packets correctly.

Routing protocols originally relied on static parameters such as distance vectors or total bandwidth of each link to make routing decisions. These protocols were not able to take into account dynamic parameters such as congestion, policy or QOS. Recently much development effort has gone into adapting the routing protocols to support these dynamic parameters. Software Defined Networking (SDN) is an example of a method of network control to allow support of complex networks. SDN relies on a separate processor to control dumb switches and routers to support intelligent routing. Unfortunately, this technology falls short if reliable links do not exist to the controller.

Packet networks utilizing these routing protocols can be considered as common control networks since the routing computers have knowledge of the network, and use that knowledge to make routing decisions.

Common control packet networks suffer from several problems:

1.) In real time the routing process can be slow compared to the dynamic changes in the network metrics causing inaccurate or erroneous decisions to be made. This is especially true in ad-hoc or mobile networks that are constantly changing.
2.) Congestion or node failures in a packet network can prevent essential information from arriving at the routing computer.
3.) Managing the flow of data through complex networks can be difficult and expensive.
4.) Paths routed in this manner are not verified so may not be reliable.
5.) Label switched paths (LSPs) routed in this manner may contain loops.
6.) Real time routing decisions cannot be made in this way as delays are too long to be practical for rapidly changing computer network.
7.) Path information cannot be collected in times of severe congestion.
8.) This type of routing cannot be used for load balancing as the load balancing parameters change with each decision.
9.) As the network grows larger and more complex it becomes difficult to make these routing decisions.
10.) Networks of this type are fundamentally insecure as routing data must be shared in band.

For these reasons, many carriers have resorted to having their packet networks engineered by outside network engineering firms. It has been found that engineered networks carry more traffic and are more reliable than networks using traditional routing protocols. The aforementioned technologies are not suitable for neural networks as the network optimization is far too slow and imprecise to support a possible neural network.

What is needed is a technology that provides the quality of engineered paths, but at wire speed and on demand for each user.

SUMMARY OF THE INVENTION

A previous application, now U.S. Pat. No. 9,542,642, to which this application is a continuation-in-part, called a Data Neural Network (DNN), demonstrated a neural network capable of making complex path selection decisions for a packet data network. This application enhances that system to allow it to exhibit more general purpose neural network functionality including the solving of complex mathematical optimization problems needed to control the power grid and robotics, and for Information Centric Networks. In order to understand the specialized terms used in this application, a glossary is provided.

Glossary

ANN—Artificial Neural Network.
COS—Class of Service.
Data Neuron—The logical component or node of a data neural network.
DNN—Data Neural Network: An artificial neural network that relies on time delay as weights for its functionality.
Edge Node—A node of an SRP network that interfaces between a traditional network and the SRP network.
FIFO—First In/First Out memory
Grid Element—A component of the Electric Power Grid such as a power source, load, or switch.
Hunting Packet—A signaling packet used to expose a path right-of-way between a source and a destination.
Label—A 20-bit address, unique to each link on each node which is modified as a packet progresses through the network.
LSP—Label Switched Path.
MPLS—Multiprotocol Label Switching.
OA&M—Operation, Administration and Maintenance.
PHY—Physical Layer (Serial Port Hardware).
PK/AV BW—Peak/Average Bandwidth. A 16-bit word to represent peak and average bandwidth requirements for a LSP.
Policy—A 16-bit code provided by system managers to limit transmission of packets on certain links.
PSN—Packet Serial Number. A 20-bit system wide serial number temporarily assigned to a hunting packet for unique identification.
QOS—Quality of Service. A 12-bit code representing priority of transmission and packet latency.
RCV/XMT—Receive/Transmit. A 16-bit number to uniquely represent each node in a Domain.
Setup Packet—A signaling packet used to establish an LSP across a path right-of-way.
SERDES—Serializer/Deserializer, Serial to Parallel converter.
SRP Network—Self-Routed Packet Network: A connection oriented packet network that functions as a neural network, and is capable of building paths as needed.
Switch Fabric Node—A node that is part of the Switch Fabric interconnecting nodes of the DNN.
Tear Down Packet—A signaling packet used to remove an existing path.
TTL—Time to Live. A 10-bit representation of time left before packet expires.
User Packet—Packets that transport user data along an existing LSP.
Virtual Neuron—A subset of a data neuron. Each data neuron can be broken up into many virtual neurons.

The Internet, a layer 3 packet network, has been proven to be an effective method of interconnecting computers. Recently there has been much interest in adapting the Internet to allow it to reliably transport packet flows such as voice and video, and to perform specialized tasks such as controlling the power grid. This invention provides a method to achieve this result.

A layer 4 packet network provides a means for the client computers to directly control connections and to use those connections to transport time sensitive packet flows reliably and securely.

The transport aspect of the MPLS architecture (Label Switching) was chosen for the preferred embodiment as it is connection oriented and shown to be reliable. The other aspects of the MPLS architecture including routing and programming of the LSP's was determined to be insecure, too slow, and unreliable, and was replaced by the architecture disclosed in this application.

A key portion of a layer 4 network is the routing system. To design a suitable routing system it was necessary to find a system that would expose an optimized path right of way between a source computer (calling party) and the destination computer (called party) as quickly as possible. In addition it must use current dynamic network parameters and not static parameters previously collected and stored.

In addition the routing needed to be an auto-discovery variety allowing the network itself to take on the routing burden so that little or no provisioning would be necessary. As previously discussed, carriers had to resort to engineered networks to achieve the optimized paths needed for the invention.

If the calling party is the talker and the called party is the listener, a simple broadcast network employing one talker and many listeners for establishing a connection would be suitable. This type of network quickly breaks down as the number of talkers increase. One approach is to increase the performance of such a network by using a distributed hardware based design that can run at a high speed as opposed to a centralized software based design found in today's networks. As the hardware approach was simple and inexpensive to implement it was chosen for the embodiment.

Although the broadcast approach works fine on local area networks (LANs), it breaks down when applied to a mesh network because loops can be created with resultant network overload. Broadcasting in mesh networks is sometimes called "flooding." Techniques such as the spanning tree algorithm can be used to correct this problem but fall short as they are too slow to adapt to changing network conditions. In addition spanning tree can deactivate links needed for load sharing.

The problem of loops can be eliminated by simply destroying all duplicate broadcast packets, which is sometimes called quenching. This embodiment caches and forwards the first instance of each broadcast packet to arrive at a node, and destroys all future instances. These packets are called hunting packets in the embodiment.

In a mesh network many paths can exist between the calling and called parties. The shortest path can be called the primary path while the other paths can be considered secondary. The hunting packet previously described exposes only the primary path as hunting packets traversing the redundant paths are destroyed.

As networks become larger it is necessary to limit the number of talkers that can access a listener at any given time. This can be accomplished by requiring each talker to obtain a token before broadcasting. Broadcast loading is now easily controlled by simply limiting the number of tokens. This embodiment uses tokens and the token is called a packet serial number (PSN).

In the simple broadcast network previously described the broadcast packets flow through the mesh network exposing all possible paths between the talker and the listener. This technique is highly inefficient because usually only a few viable paths exist and should be explored while exploring the remaining paths is a waste of network resources.

This embodiment uses a method called bridging to reduce the transmission of unnecessary hunting packets. When a hunting packet from a first node looking for a second node arrives at any given node the identity of the first node is cached at the receiving port. Any future hunting packets looking for the first node, including those from the second node, will only be forwarded on ports bearing the signature of the first node. This technique along with others known to those of skill in the art limits the number of hunting packets to a manageable level.

Although the aforementioned techniques can be used to provide the fundamental structure for the disclosed routing method, they are not sufficient to be acceptable for the disclosed network. When a hunt occurs in the disclosed network for an optimal path several simultaneous conditions must be met. For example, the desired packet flow will need to be a certain bandwidth, its latency must be less than a certain limit, and it must meet certain policy and QOS constraints. The transmitted hunting packet will contain a binary representation of each of the required metrics. Each node will check each constraint and only forward hunting packets that will meet every specified condition.

Special hardware is disclosed in the embodiment that allows the checking to be done in a pipelined fashion so that no appreciable delay is incurred as the hunting packet passes through each node.

Consequently, the only appreciable delay a hunting packet may incur is the propagation delay between nodes, or perhaps intentional delays inserted as part of policy constraints. In this manner a hunting packet will traverse the same path right of way that a user packet would traverse (assuming the perspective route was chosen). Because the delays encountered by the hunting packet match the delays that would be encountered for the final packet flow, a true and accurate model has been made at each path selection. The hunting packet arriving at the called party first has, by definition, taken the most optimum path at that instant in time. Since in most cases no appreciable delay will have occurred, other than the propagation delay, the path selection is said to have been at wire speed. As the packet metrics are taken into account on each link traversed, the final choices can support very complex routes that would be virtually impossible to model offline. As each routing decision is made using real constraints and under real field conditions, the network will be self correcting and self optimizing. External policies can be used to "teach" the network certain preferred routes. This teaching is accomplished by adding delay to less desirable routes thereby encouraging the selection of a more desirable route. This ability to teach the network is an indication that this network is a neural network.

Once the hunt for the optimal path right of way has finished, it is now time to build the actual path between the calling and called parties. For a layer 4 packet network to be viable it is necessary for no appreciable delay to occur in the path setup process. For each node in this embodiment the first arrival of a hunting packet at a given port is cached at that port. In addition the ports that forwarded said hunting packet also cached a link between the arrival port and departure port. A special packet called a setup packet follows the links back to the calling party programming the label switched path (LSP) at each node traversed. When the setup packet arrives at the calling party, it passes the label for the required path. As this process also operates at wire speed, a layer 4 connection has been made between the calling and called parties as fast, or even faster than any possible layer 3 network could have performed the task. Because this programming task only involves the nodes and links used for the connection, this process fundamentally secure and can be called "distributed control".

The architecture disclosed in this embodiment uses special hardware and is memory intensive. For these reasons this approach would not have been viable when the Internet was developed.

This system and method allows each user to make a connection on demand in real time, as opposed to the existing MPLS layer 2 technology that requires a third party to make connections for groups of users off line.

The MPLS networking architecture in use today is insecure as it depends on an IP routing platform to perform the routing and network management functions. The network technology disclosed in this embodiment not only supports the label translation aspects of MPLS, but contains additional specialized packets that support additional network functions such as path exposure or identification, path setup, path tear down, and OA&M functionality.

The previously described technology is ideal for ANNs, as the creation and destruction of paths is under the control of the network. As seen from the references, for a network to be a neural network, it must use weights to affect the output of each neuron. The network disclosed in this application also uses weights at each node to aid in the establishment of each LSP. The details of these weights are discussed in the "Description of the Preferred Embodiment". In order to understand the operation of a data neural network (DNN) as described in this application, it is necessary to review the concepts taught by McCulloch and Pitts as seen on page 34 of Reference 1, and FIG. 29: "This mathematical neuron computes a weighted sum of n input signals $x_j$, $j=1$, $2 \ldots n$ and generates an output of "1" if this sum is above a certain threshold "u". Mathematically, $$y = \theta\left(\sum_{j=1}^{n} w_j x_j - u\right)$$

Where $\theta(\cdot)$ is a unit step function at "0", and $w_j$ is the Synapse weight associated with the $j^{th}$ input."

In adapting this model to the data network of this application, the variable $x_j$ is associated with the $j^{th}$ LSP, and the variable $w_j$ is associated with the time delay incurred by a packet traveling along the LSP.

The threshold value "u" corresponds to the time-to-live (TTL). Setting $$u = \frac{1}{TTL}$$

as TTL sets a limit for maximum latency.

For this network, $$w = \frac{1}{T}$$

This delay $$T = T_P + T_Q + T_L + T_W$$

Where
$T_P$=Propagation delay of the logic.
$T_Q$=Queuing delay from congestion
$T_L$=Latency of the link between the nodes
$T_W$=Additional delay added to influence path selection $$T = \sum_{j=1}^{n} t_j$$

and $t_j$ is the delay of each hop.

Where n is the total number of hops traversed by the LSP.

The behavior of a DNN can be easily verified against the expressions above, as the best network choice will have the least latency $T_L$, and will have the largest weight. In other words, the longer the delay, the lower the weight. Also, delays longer than TTL yield a weight of zero.

The delay T is a sum of several components. Each component contributes to the total delay, so must be taken into account. $T_W$ is actually the sum of two delays: $T_{Wn}$+ $T_{WV}$. $T_{Wn}$ is used to normalize, or correct for imbalances in the network to allow it to yield accurate results. $T_{WV}$ is the time delay variable that describes the relationship between the objects in the problem. Another way to provide more control of connections with $T_W$ is to make $T \simeq T_W$. This can be done by making $T_W \gg T_P + T_Q + T_L$.

For a data network to be upgraded to a neural network of this application, ones of skill in the art will need a reliable and secure network where each path is deterministic and can be guaranteed. They will also want a reliable network where usage can approach 100% without any degradation of the network. They will also want a network needing little provisioning and traffic engineering. This architecture meets all these requests. Some of the features of this architecture are as follows:

1) Automatic setup and teardown of LSPs at wire speed.
2) Built-in support of policy and QOS including latency.
3) Strict admittance controls to limit congestion.
4) OA&M built into architecture.
5) No upper limit on complexity or size.
6) Automatic rerouting around failed nodes or links.
7) Automatic building of completely independent redundant paths.
8) Low cost, highly reliable hardware platform.
9) Support of Layer 2 services including TDM voice.
10) Provisioning used to enhance network performance, but not required for basic setup.
11) Full multicasting support.
12) Adjustable delays associated with each LSP to tune network functionality.
13) A fundamentally secure network where information only passes between the sender and the receiver, and addresses are only known to the network.

BRIEF DESCRIPTION OF THE DRAWINGS

FIG. 20 is a drawing illustrating the data structure of the 64 bits in the User Packet address.

FIG. 21 is a drawing illustrating the data structure of the 5 levels of 64 bits illustrating the Hunting Packet.

FIG. 22 is a drawing illustrating the data structure of the 2 levels of 64 bits illustrating the Setup Packet.

FIG. 23 is a drawing illustrating the data structure of the 64 bits in the Teardown Packet address.

FIG. 24 is a drawing illustrating the data structure of the label translation table in the forward direction.

FIG. 25 is a drawing illustrating the data structure of the Packet Serial Number (PSN) Reference Table.

FIG. 26 is a drawing illustrating the data structure of the Label Translation Table in the reverse direction.

FIG. 27 is a drawing illustrating the data structure of the Branch Table.

FIG. 28 is a drawing illustrating the data structure of the Output Port Flag Table.

DESCRIPTION OF THE PREFERRED EMBODIMENT

Physical Architecture

Figure 1:
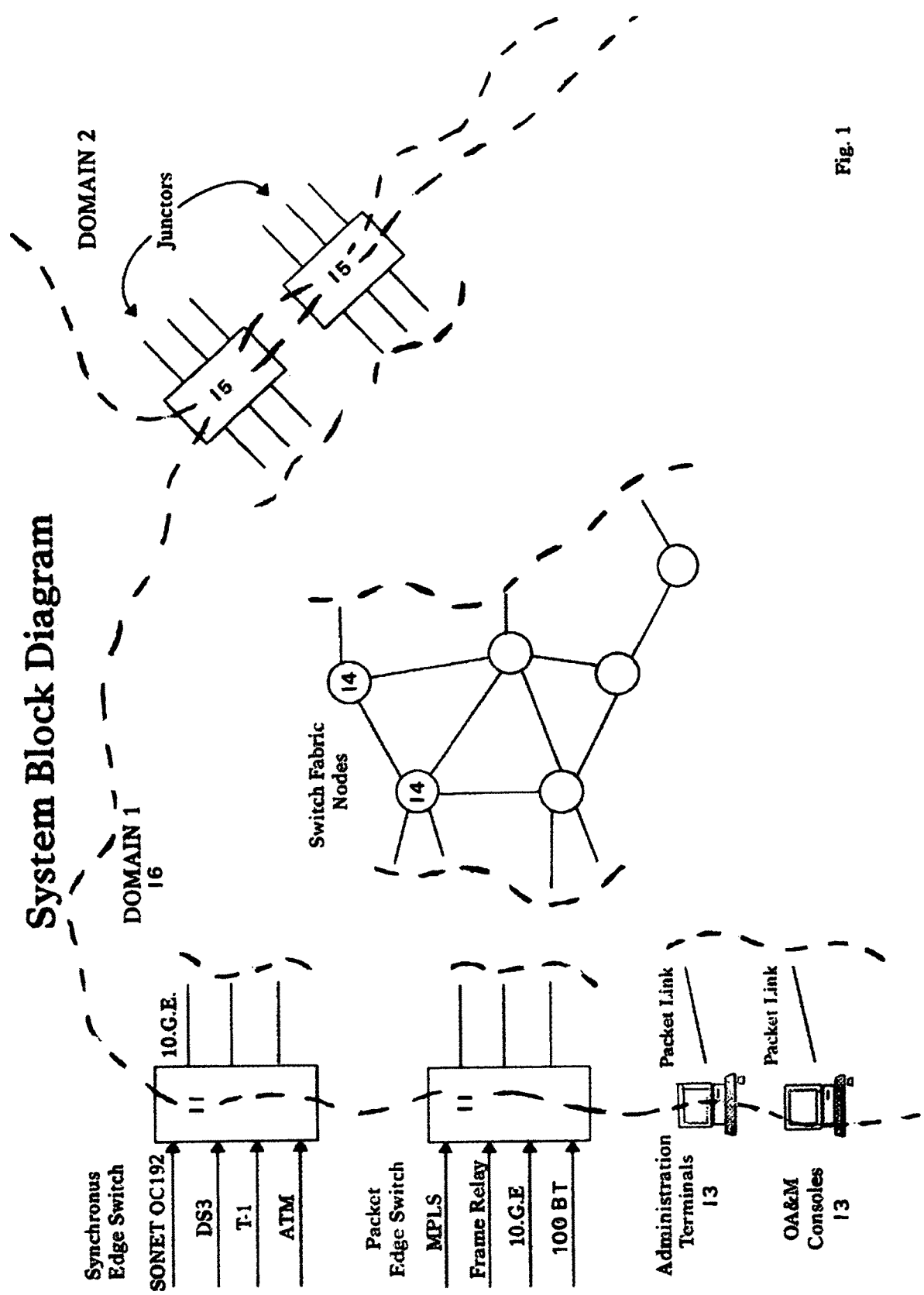
FIG. 1 illustrates the overall system block diagram of an example Layer 4 self-routed packet (SRP) network which functions as a Data Neural Network (DNN).

This section describes the physical architecture of a model system design of an MPLS type network using the SRP Networking methods.
A domain is a collection of nodes that are managed by the same entity or are in a specific geographic area. FIG. 1 shows a typical SRP Network Domain. A domain 16 consists of Edge Nodes 11, Junctors 15, Switch Fabric Nodes 14, OA&M consoles 13 and Links that interconnect the nodes.

Edge nodes 11 provide entrance and exit ports for a SRP Networks Domain. Edge Nodes 11 translate between the layer 4 SRP Networks Architecture and other networking architectures such as MPLS, ATM, Frame Relay, SONET, TCP-IP, TDM, etc. Edge Nodes 11 use Hunting Packets to build Label Switch Paths (LSPs) to other Edge Nodes subject to QOS requirements such as latency and guaranteed bandwidth, and subject to policy constraints such as access restrictions, use of specific service providers, link cost or types of links. An Edge node can be a specialized piece of hardware such as an intelligent channel bank or multiplexor with a processor to establish or manage the layer 2 path to a similar node at the other side of the network. The edge node can also be a PC executing a special layer 4 protocol stack that manages the connection directly, or operates the network as a DNN.

Junctors 15 are special edge nodes used to link between SRP network domains. They provide a logical connection point where Hunting Packets are terminated. The SRP network methods allow hunts to traverse multiple domains as part of a path hunting phase. When DNNs are part of a physical device, such as in robotics, the Junctors provide a logical connection point for the devices.

Switch Fabric Nodes 14 (Data Neurons) form the heart of a SRP networks domain 16. They form a mesh network interconnecting each other and edge nodes to form a data neural network (DNN). Switch Fabric Nodes 14 contain little intelligence and only store enough routing data to move a packet to the next node or to make simple changes to the packet. Arrays of these nodes may contain special sensors, interfaces, or computational abilities to allow them to serve as data neurons in complex DNNs.

OA&M consoles or Administrative Terminals 13 are computers running administration software used to teach the network. These terminals appear as edge nodes to the Domain 16. These terminals collect OA&M data from each node in the Domain 16. The OA&M data consists of node and link status, traffic data, congestion, latency information, link failures, etc. The data can be displayed in map form on the console with new nodes and links automatically appearing. The consoles operate automatically, and optionally provide a means for system administrators or network engineers to enter policy information to be sent to all the nodes in the Domain. The consoles can also be used to model the network and test perspective policies. In effect, the consoles provide a means to teach the neural network the functionality it needs to perform efficiently.

A link can be any transport medium including fiber, wire, or radio. The links can be any speed including 10G Ethernet. All links are bidirectional and are in service only if both directions are operational. In the case of radio or optical, the links can be point to multipoint where the established link is dependent on location of radio or optical receivers. Under certain circumstances the reverse direction may need to be set up independently.

Figure 2:
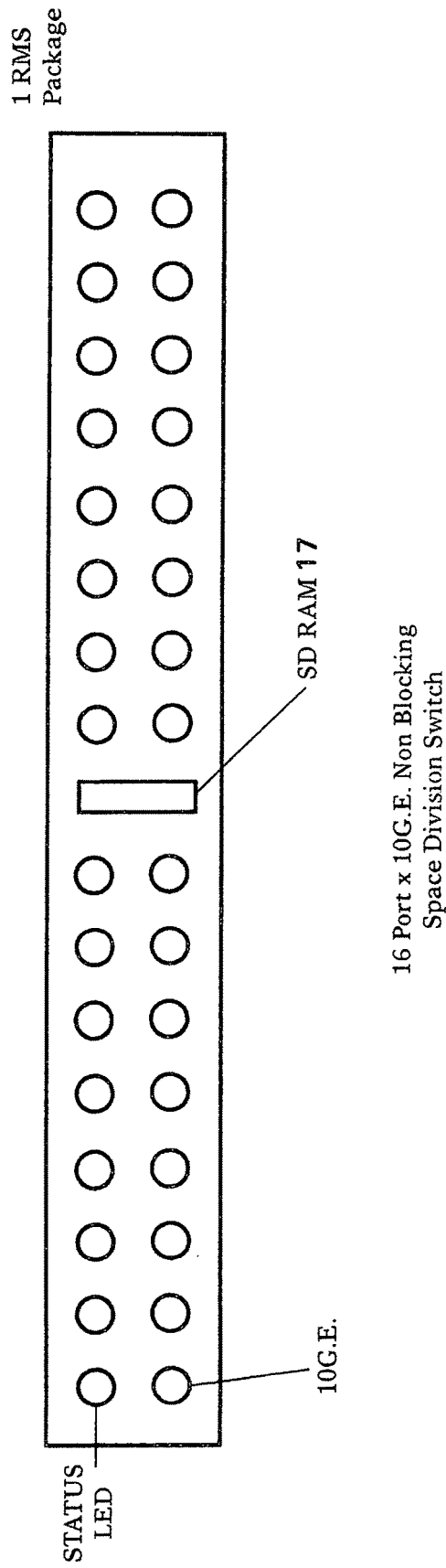
FIG. 2 illustrates a physical design of a representative Switch Fabric Node of the SRP network, which is also a Data Neuron in a neural network.

FIG. 2 shows a drawing of a typical SRP Networks Node. This node contains 16 10 GE ports and is One R.M.S. high. The node would be NEBS Level 3 compliant and operate on −48 Volts DC. The node would contain an SD RAM flash memory 17 containing security keys and policy information. The node would have a tri-color LED associated with each port. The LED would allow service personnel to see at a glance the status of the links.

Today's data networks use OSI Layers to isolate higher and lower data functions. The higher layers depend on the proper operation of the lower layers to ensure proper system operation. This section will discuss the operation of the SRP Network by layer:

The lowest layer is the physical layer. SRP Networks supports most popular physical links such as Ethernet, T1, or SONET.

Each link uses "PHY" chips to support framing and link signalling. The messages between these chips and SRP are used as part of Layer 2 conductivity.

Layer 2 messages are used for 2 nodes connected by a link to communicate.

SRP Networks can be used in a completely open environment, or it can be made secure through the use of encryption.

Node Synchronization

When a new node is connected to the network, Layer 2 messages are exchanged to ensure the node is part of the network. Static keys are exchanged, and a node number is assigned to the new node to become part of the network. Once this process in completed, the synchronization process can start.

In order for a SRP Network Domain to measure delay between nodes and to properly time stamp packets, each node must be synchronized in time. This synchronization is done through the exchange of timing messages between nodes. This synchronization requirement may be relaxed if each node contains an accurate (GPS type) internal clock. First, the clock on the new node must be synchronized with the rest of the system. The node contains a phase locked loop that is synchronized to the other nodes in the system through the transmission of timing messages. Network synchronization is usually accomplished through the use of an external reference (usually a GPS source) and by having nodes synchronize off that source. Many synchronization schemes are known to those of skill in the art and will work in this system. Also, if the nodes are co-located, synchronization can be as easy as using a common clock and frame.

Once a new node is synchronized to the network, link delay must be measured. This is accomplished through the exchange of timing messages. It should be understood that when a node is not stationary, the synchronization process is more complex as offsets are needed to correct for the motion.

When the synchronization process is complete, the node is said to be "locked." Locked nodes all share a precise time reference. For secure systems the time reference can be used as one of the keys. Systems locked together like this can provide for very accurate time stamping of packets and very accurate measurement of latency across the network. This synchronization also allows SONET and other layer 2 synchronous services to work correctly through the network.

The communication of link status between nodes is essential to ensure that the link is functioning properly. For example, link error rate may need to be checked. If the error rate degrades to the point that link reliability is threatened, the link will need to be taken out of service. When the link is removed from service the network can re-switch packet flows to the other working links. Co-located networks used for math problem solving do not need the above functionality as the nodes and links are under a central control and not subject to the issues discussed above.

Layer 3 signalling packets are those used to set up an LSP, manage an existing LSP and packets used to manage the transportation of a payload through an LSP. Examples are Hunting Packets, Path Setup and Path Teardown packets, OA&M packets between nodes, and payload management packets.

Layer 4 operations occur at the interface point between the edge nodes and the users. It is for this reason this network can be called a layer 4 network. This is the point where packet data is converted to SRP MPLS. Management of the LSP occurs at Layer 4. The checking of latency and packet loss and the building of replacement LSPs are all Layer 4 functions.

Application Layer operations can occur once the network is set up. The network can support transport of user packets, or it can act as a platform for solving higher level problems.

System Operation

This section deals with the basic operation relating to the setup and management of LSPs. LSP operation can be divided in four phases. These are as follows:
1) Path Hunting
2) Path Setup
3) Path Usage
4) Path Teardown System operation is described in relation to the SRP methods; however, these phases can exist in all networking technologies. The operation described can be applied to all packet technologies including IP networking.

Figure 3:
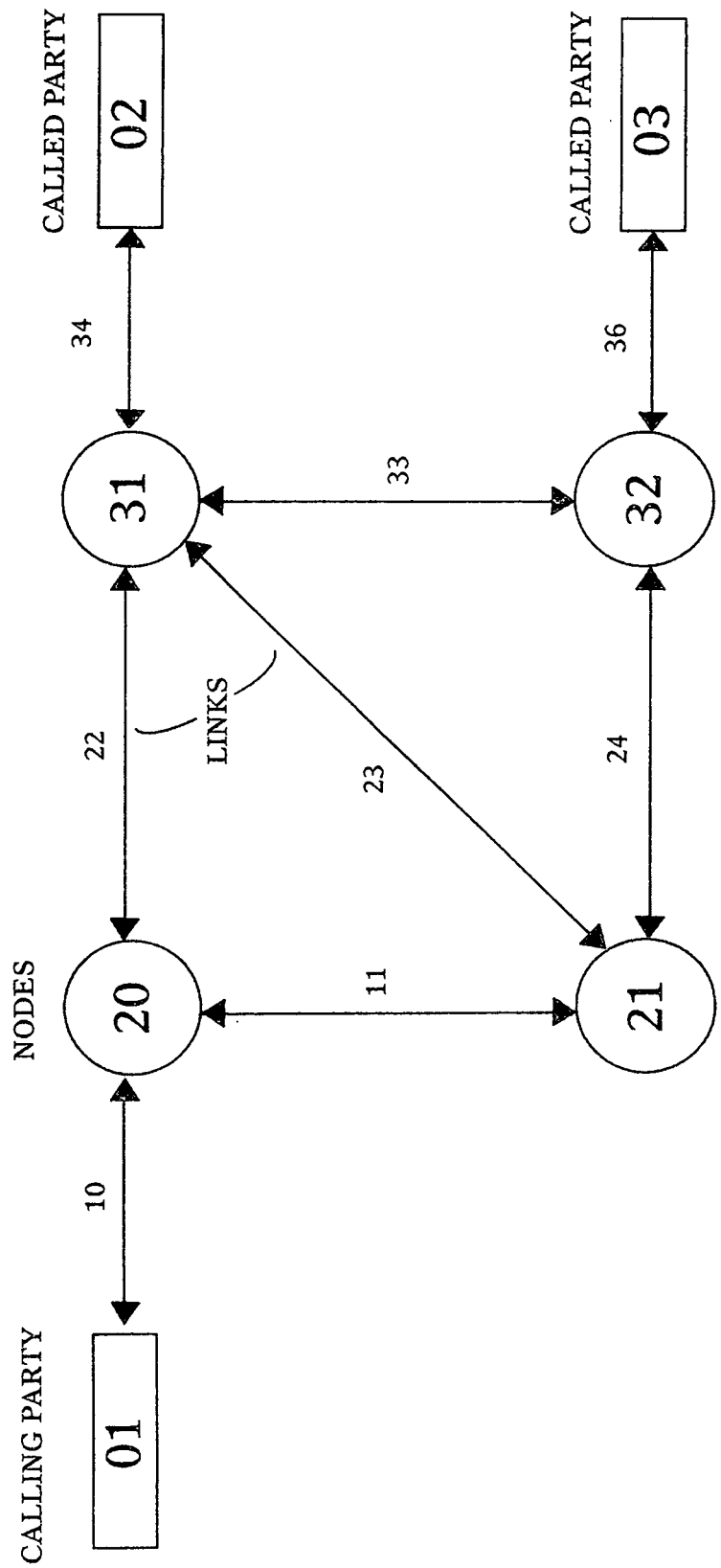
FIG. 3 is an SRP network schematic diagram used to illustrate the progression of a connection through the network from a calling party edge node to a called party edge node.

The hunting phase is entered as soon as a path is needed to carry packets between the calling and the called parties. FIG. 3 shows a typical network consisting of nodes and links. When calling party 01 needs to build a path to called party 02, party 01 would transmit a hunting packet. A hunting packet is a signalling packet used to build a path right-of-way between two or more edge nodes. In the example, edge nodes are 01 and 02. FIG. 21 shows the data structure for a hunting packet.

Hunting packets flood the network subject to policy and congestion constraints. When a node receives a hunting packet it will retransmit that packet on each link leaving the node except the arriving link, subject to policy constraints. In the example on FIG. 3 calling party 01 would transmit a hunting packet on link 10 arriving at node 20. As can be seen by one of skill in the art, a method of limiting transmission of hunting packets is needed to prevent broadcast storms. The limiting occurs by providing each hunting packet with a unique bit pattern called a packet serial numbers (PSN). This PSN, along with a time stamp, is used to identify duplicate hunting packets. All duplicate packets are destroyed. FIG. 25 shows a PSN reference table. In the example, node 31 would receive hunting packets from nodes 20, 21 and 32. Only the first arriving hunting packet would be retransmitted (probably the one arriving on link 22). The retransmitted hunting packet would arrive at the calling party 02 on link 34. The path traversing links 10, 22 and 34 is called a path right-of-way.

Many factors can influence the outcome of the hunt: Policy constraints can delay or block the progression of hunting packets through certain links. Congestion can delay the packet's progress through certain links allowing the optimum path to be chosen through other non-congested links. Each hunting packet carries a time stamp. This time, coupled with QOS data, defines the maximum time allowed for the packet to exist. This time signals the close of the hunt and all the hunting packets carrying that time stamp are destroyed.

Each node logs the first reception of a hunting packet. The arrival time along with the port receiving the packet is logged opposite the PSN. This information is used later during the path setup phase.

When the called party 02 receives the hunting packet from the calling party 01, the called party will set up a path from 01 to 02. To build the path the called party will transmit a setup packet on link 34 to node 31. A setup packet is a special signalling packet similar to a hunting packet. FIG. 22 shows a setup packet data structure. A setup packet contains a special address that tells each node to perform the logic functions that are about to be described. The setup packet sent by the called party will contain a label selected by the called party to identify the connection. It will also include policy and QOS data, and the PSN and time from the hunting packet previously received. When node 31 receives the setup packet it looks up the PSN and checks the other data to ensure the setup packet matches the previously stored hunting packet. The stored data includes a reference to the port that received the hunting packet.

In the example in FIG. 3 each node contains a port that is associated with a link connected to another node. Each port contains a processing system including a translation table. This translation table (FIG. 24) is a memory where the address corresponds to a label, and the data contains another label along with port number, QOS and time data. This translation table is read and written each time a user packet traverses the node. When the setup packet arrives at node 31 on link 34, it is validated and forwarded to the port corresponding to link 22.

The processor associated with the port for link 22 selects a label from a table of available labels, and programs the translation table at the selected label's address with the label from called party 02, along with QOS, time data, and the address of the port receiving the setup packet (link 34).

After programming the translation table the processor replaces the original label in the setup packet provided by called party 02 with the label it just selected and transmits the packet on link 22.

When the setup packet arrives at node 20, the procedure just described is again performed, and the packet is forwarded to the calling party 01 on link 10. When calling party 01 receives the setup packet containing the label from Node 20, it has been given the label for a new LSP from the calling party 01 to the called party 02.

As seen from this example, the path setup process can occur at wire speed when suitable processors are selected. Also, the process is independent of the number of nodes involved, functioning in the same manner for large networks with many nodes as the example just discussed.

For systems involving a static address, such as IP networks, an IP address can be provided by called party 02 in response to a request by party 01, or the address can be provided by party 01 and acknowledged by party 02. Instead of a label provided by party 02, the setup packet for party 02 would contain the IP address. That same address would be programmed into the translation table (or packet forwarding table) of each of the intermediate nodes all the way back to party 01 as previously described.

In the example when called party 02 provides the label to calling party 01, the LSP is said to be "cut through." Once the path is cut through, node 01 can start a packet flow to Node 02.

When Node 20 receives a packet from calling party 01 it looks up the label which produces the address of the port for link 22 along with the new label. It checks the time stamp to see the packet is current and replaces the label and forwards it to link 22. This method is repeated until the packet arrives at the called party 02.

A path teardown will occur when the user has finished transmission and no longer needs the path. Path teardown can also occur in the event of a failure of the link. A signalling packet called a teardown packet (FIG. 23) performs the procedure. The packet can be generated by the edge node as part of a Layer 4 function, or it can be generated when a node detects a path failure. When a failure occurs, the node sends a teardown packet on each LSP associated with the failure. A teardown packet looks and acts like a user packet, and it traverses an LSP in the same manner.

In the previously discussed example of an LSP between Node 01 and Node 02, assume a failure of path 22. The port for path 22 triggers Node 31 to initiate a teardown packet. Node 31 sends teardown packets on all LSPs including the LSP traversing link 34. When the processor associated with the port connected to link 34 reads the packet, it clears the entry in the translation table associated with the LSP. It then transmits the packet over link 34 to called party node 02. At this point, a layer 4 process can re-establish the connection.

Teardown packets are also employed when a problem exists in the setup process.

In the previous discussion of a path setup between Node 01 and Node 02, assume a failure of link 22 occurred just after the hunting packet exposed a path right-of-way. When the setup packet reaches Node 31 via path 34, Node 31 attempts to build a path onto link 22 and discovers the failure. The failure triggers the initiation of the teardown packet at Node 31. The teardown packet propagates back up the partially completed LSP to the called party Node 02. Layer 4 functions cause the transmission of a new hunting packet from Node 01. The hunting packet exposes a new right-of-way not using link 22 and the LSP is set up.

System Features

As has been shown in this document, the selection of an LSP is a combination of many variables:
Satisfaction of policy constraints; plus
The propagation delay of each hop; plus,
The queuing delay of each node, which is dependent on COS; plus,
Weightings for the cost of each path; plus,
The functions of paths out of service or have become too severely congested to be available.

In addition to above, the path choice is dependent on choices made for other paths taken by users that have a higher priority or class or service (COS) than the user in question.

Once the path is chosen, the quality of that path can degrade over time as other higher priority users consume more resources for their paths. As a path becomes more congested, its latency increases. By monitoring this latency, it is possible to determine when the latency has exceeded a predetermined threshold, and to initiate a hunt for a new path. Assuming the hunt yields a new path, the LSP for the packet flow is replaced by the one for the new faster path. Once the old path is no longer needed, it is torn down.

This process of building new LSPs to control latency is called LSP churn. LSP churn is a by-product of a self-routing system such as this one, and needs to be controlled to maintain network stability. A network of this type will need to continually adjust itself to maintain stability.

Several methods can be used to control LSP churn: The simplest method is to provide adequate links and nodes to support network traffic. The hunting algorithm will evenly load multiple links. This load balancing capability will allow additional links and nodes to be turned up in parallel with existing ones to spread the load and relieve congestion.

Another method of control is through policy restrictions. Each hunting packet carries a policy profile. This policy profile is indexed into the master policy map of each node. Through the use of this policy profile the network is fundamentally secure and the system manager has complete control of each packet flow and can limit certain packet flows to specified paths. With this technique, packet flows with high priority can traverse links previously made off limits to lower priority packets, ensuring bandwidth and latency requirements are met.

Another method of control is through the use of QOS and bandwidth controls. Each hunting packet includes a specification of QOS and bandwidth. These QOS and bandwidth parameters are assigned at Layer 4 and are encoded into the hunting packet. QOS is controlled by assigning a separate class of service to each packet flow. Packets are queued based on COS. This system uses a technique called hard QOS; all packets in a higher priority queue must be exhausted before lower queues are allowed to empty. Hunting packets are forced to wait in the same queues as user packets of the same COS. In this manner, the LSP right-of-way exposed by hunting packets matches the conditions that will be seen by the potential new packet flow, and choice of the route for this new packet flow is made based on real network variables.

Each port on a node keeps a tally of the available bandwidth on its link. This bandwidth is stored based on QOS. A packet flow with a higher class of service (COS) has access to all the bandwidth except for what was taken by higher-class flows. Each time an LSP is assigned, the available bandwidth requirements are checked before a hunting packet is allowed to traverse a link. In this manner, only suitable links are included in each hunt.

When the hunt is finished and the called party node accepts the connection request, it transmits a setup packet. This packet traverses the right-of-way exposed by the hunting packet. When the setup packet programs an LSP into a node, the available bandwidth for that COS for the link containing the LSP is reduced by the amount to be used. If the available bandwidth is used up on a given link before all setup packets have passed through the link, the link will be blocked for the remaining setup packets. When the new LSPs do not appear in time, Layer 4 functions will re-issue the hunting packets which will build new right-of-ways that do not include the previously mentioned link.

When there are too many users and too few links on a congested network, other methods can be used to load additional users on a congested network. A scheme called COS forward biasing can be used to fit a few more users onto a network by. elevating the COS of the new users by one level. This can displace existing users which in turn will find new routes. Tests like this should be done only under controlled conditions or modeled at OA&M consoles to insure no service outages occur.

Another bias technique is called reverse bias. Reverse bias sets the hunting packet COS one level lower than the COS for the LSP. The result is that the hunting packets do not compete with the packet flows carrying that COS. This bias scheme causes the minimum amount of disruption to the network as ample bandwidth must be available for a link to be chosen for the LSP.

For large networks, servers would be used to control the use of hunting packets. A user would request a path through a server which would have already secured paths to common destinations. The servers could act as gate keepers by limiting requests to unauthorized locations. Users could subscribe to servers in a similar way as subscribing to telephone service.

To ensure viability and security of a SRP Networks domain, it is required that the user and control planes remain separate. The signalling packets discussed in this document must not be accessible to users. This isolation is provided by the edge nodes. The signalling packets are for the exclusive use of the system administrators and the system itself. Various checks can be performed in the signalling functions to ensure system integrity. Signalling packets appearing that are not part of a previously described process must be alarmed immediately. Additional measures can be provided when portions of the network are exposed to outside forces. The previously discussed policy map included on each hunting packet can be expanded and encrypted ensuring hunting packets produced by outside forces only go to an authorization center. The center can validate the user and supply additional keys to allow the user to only hunt nodes that are cleared.

Admission to the network is only provided through the generation and subsequent acceptance of a hunting packet. Improperly generated hunting packets are ignored and alarmed.

Hunting packets employ a Packet Serial Number (PSN). This serial number is unique to each hunt. Each node is assigned a block of one or more PSNs depending on its traffic. The PSN is coupled to a time stamp to uniquely identify each packet on the hunt. A PSN assigned to a hunt cannot be used again until the first hunt is finished. As each node has a limited number of PSNs, it is limited in the amount of simultaneous hunts it can perform. As there are a limited number of bits in the PSN field for hunting packets, there are a limited number of simultaneous hunts that can take place at any given time. As the hunting packet PSN space is spread out over the entire domain, the number of simultaneous hunts is further limited. As hunting packets only traverse available nodes and links, the presence of hunting packets does not impair network performance. Also, the node hardware design allows hunting packets to be processed at wire speed. This combined with the fact that the length of hunting packets is extremely short further minimizes the impact of these packets.

The packet waiting system is used to provide weights or delays on certain packets such as hunting packets as they propagate through the network. These weights slow the propagation of certain packets as they traverse the system allowing packets on less desirable routes to catch up. In a sense, these packets "level" the playing field. Packet waiting is implemented through the policy system allowing system administrators or system software to tailor routing decisions to match real world constraints. Delays can be assigned to hunting packets traveling on very fast, but expensive routes to bias choices toward less expensive routes, but allow the use of the more expensive routes as the cheap routes fill up. In this manner, complex routing decisions can be made based on actual network conditions in real time, thereby avoiding slow, expensive, complex and often inaccurate off-line modeling. In most cases, packet waiting variables are static and can be added to policy profiles and automatically downloaded to nodes from the OA&M consoles.

Through packet waiting, neural network functionality is exhibited, as extremely complex routing decisions involving choices between routes of different costs, times of day, capacities, traversing long distances, changing paths and carrier requirements can be made almost instantly. Packet waiting is fundamentally secure as it is physically impossible to reverse time.

By providing each port on each node a shift register delay line, or equivalent software implementation, the system can be easily made to support packet waiting. The policy bits on the hunting packet can be indexed into the policy table for that port to obtain a value to program for the delay. The hunting packet is then forced to wait that amount of time before it can move to the next node. As the delay is provided on a "per node" and "per policy", and "per QOS" basis, complete control is provided on the routing of each packet flow.

In addition to the policy related routing decisions previously discussed, there are several other benefits of packet waiting: For example, if one wanted to build a redundant path, one that did not traverse the same nodes or links as the original path, packet waiting could be used. By assigning delays (weights) to the original path, and then transmitting a hunting packet, the newly exposed right-of-way will avoid, as much as possible, the original path. Packet waiting is a platform used to support several complex features that will be discussed later. The weights give the network intelligence necessary to perform the complex routing and to act as a platform to solve complex math problems.

Under certain conditions it is possible to build a first and second path for packet flows between an originating and a terminating node. The second path can have as few as possible shared links or nodes with the first path providing an extremely reliable packet flow. The redundant path carries the same packet flow as the original path except that it is delayed by $\Delta T$. The additional delay $\Delta T$ is the difference between the first choice path and the second choice path. Arriving data on the two paths can be compared and a decision can be made as to which packet flow will be forwarded to a receiver.

Multicasting has become very important as a means to transmit high-speed video or other information. The support of multicasting on previous MPLS systems has been problematical, as it requires the processing of large amounts of path data.

Multicasting is automatic in the SRP Networks Technology, as each node must replicate hunting packets as part of exposing a path right-of-way.

This replication or "branching" occurs automatically as part of each hunt. The right-of-way exposed with a hunt can be seen as a tree with the trunk at the source node and the branches extending out to the destination nodes.

FIG. 3 shows a model network with calling party 01 and called parties 02 and 03. From the previous discussion a hunting packet exposed a path right-of-way from node 01 to node 02 via nodes 20 and 31.

If needed, the same hunting packet could have exposed a path right-of-way through Nodes 20, 21 and 32 to Node 03. In this example, a hunting packet leaving Node 01 would arrive at Node 20 through link 10. Node 20 would transmit the hunting packet on links 11 and 22 to Nodes 21 and 31. The same hunting packet would then be transmitted to Node 02 via link 34. Another instance of this packet would be transmitted to Node 32 via links 33 and 24. Node 32 would transmit the hunting packet to Node 03. If both Nodes 02 and 03 were programmed to respond to the same packet ID, a branched connection could be established.

In the example system, Node 32 received 2 hunting packets: one on link 24 and one on link 33. Assuming the first packet to arrive was on link 24, the node would assign that link as the trunk of its tree, and would ignore the packet arriving on link 33.

As previously discussed, Node 02 would build a path right-of-way back to Node 01 via Nodes 31 and 20. If branching was enabled, Node 03 could also build a path to Node 01 through Nodes 32, 21, and 20. In this example, Node 20 becomes the branch point. If conditions were different, Node 31, or even Node 32 could just as easily been the branch point.

The propagation of a setup packet from Node 02 to Node 01 for the purpose of building an LSP was discussed previously. In the same manner, a setup packet would go from Node 03 back to Node 01 via Nodes 32, 21 and 20.

Assuming the LSP from Node 01 to Node 02 was set up first, the setup packet from Node 03 would arrive at Node 20 on link 11. Note that both setup packets contain the same PSN and time stamp as they were derived from the same hunting packet. If branching is allowed, Node 20 would forward both packets back to Node 01 via link 10.

As Node 20 became the branch point, it would forward all user packets bearing the LSP it had previously assigned on both links 11 and 22.

It should be noted that the label translation table at Node 20 for this packet flow would show 2 ports for links 11 and 22 along with a separate new label for each link.

It should be also noted that the first setup packet to reach the shared portion of the LSP e.g.: the trunk of the tree would actively program the LSP back to the source node. Each additional setup packet would merely follow the path back to the source node. The calling party node 01 would receive setup packets each providing the same label but showing different called party nodes. In this manner, the calling party node always knows all the called nodes receiving the packet flow.

LSP conditioning is the binding of an LSP to a PSN. When LSPs are first setup they are bound to a PSN, but the binding disappears when the PSN is reused on another hunting packet. The PSN supplies a system-wide identification for an LSP, making it possible to use the LSP for other procedures.

Typical procedures include: the addition of a redundant LSP, adding more receiving nodes to a multicast LSP, merging additional transmitting nodes to an existing LSP.

A conditioning packet is transmitted into an LSP by the source node for that LSP. The packet travels through the LSP programming a PSN and a time code to each node along the path. Once conditioned, special hunting packets can be transmitted to implement the desired function.

Conditioning is also used when a network is used as a DNN for solving complex problems. Through the use of policy limitations and conditioning packets, hunts can be limited to pre-defined LSPs and nodes. In this manner, hunts can only occur on links with pre-defined delays between nodes that are part of a DNN solving complex problems such as the traveling salesman problem.

LSP merging occurs when multiple nodes wish to transmit packet flows that merge into an existing LSP. SRP networks can support merging in the following way: A special conditioning packet is transmitted along the existing LSP. The conditioning packet programs each node to respond to a unique bit pattern. A hunting packet containing a special bit pattern is then transmitted from the joining node. The first node to receive the pattern will respond with a setup packet. When the setup packet arrives back at the joining node with the new LSP, the merge is completed. Additional setup packets will be rejected by the joining node.

Another method of merging involves the use of the packet waiting function. By forcing all nodes not carrying the existing LSP to delay propagation of the hunting packet, the new packet right-of-way will follow the existing LSP back to the receiving node providing a duplicate path to the existing LSP. The duplicate path is then merged with the existing path at the merge point.

An alternative to using the conditioning packet is using the label stack approach found in MPLS. Labels can be nested so that a hunting packet is carried as a user packet to the point where the hunt must start. The stack is popped and the hunting packet goes to work. This method can be used in mixed networks where part is SRP, and part is standard MPLS.

As can be seen from previous discussions, LSPs are programmed from the receiving node back to the transmitting node with the aid of the hunting packet PSN. Once the path setup is complete, the PSN is no longer used and the path becomes one-way. One-way paths have a problem that there is no direct way for a path failure to be reported back to the transmitting node. System performance can be greatly improved through a bi-directional path to carry signalling packets back to the source. A path failure signal can cause the transmitting node to issue a new hunting packet, and build a replacement LSP with little data loss.

Bi-directional LSPs require each port processor on each node to have a second label translation table. The first translation table converts the previous label to the next label of the path. The second translation table is simply the inverse of the first with the address consisting of the next label and the data consisting of the previous label. The second table would be programmed along with the first, with the data portion of the first for the address of the second, and the address portion of the first being the data portion of the second.

In addition to the label translation aspect, the table must include the address of the outgoing port. In a similar manner the second translation table will include the address of the incoming port.

It should be noted that the network is not optimized for packets flowing in the reverse direction, so congestion in this direction may be encountered. The congestion problem is reduced by making these signalling packets carry a high QOS to provide them priority over other packets flowing in the same direction. As packet flows in the reverse direction should be extremely small, little effect on user packet latency should be noticed.

When a node experiences a link failure, the affected port transmits a teardown packet. With bi-directional LSPs the teardown packet would be transmitted on the reverse path back to the source of the packet flow, along with being transmitted to the destination of the packet flow. The teardown packet would now completely remove the LSP in both directions back to both the source and the destination. The teardown packet would also reduce the bandwidth logged by each port along the path.

SRP networks provide several methods of limiting the flow of hunting packets and possible resultant congestion. One method that can be used to control hunting packets is bridging. The use of bridging is most effective when a portion of the network is connected by a limited number of links to the main part of the network. Under these conditions the links could have a larger than usual percentage of hunting packets. If the links are of low bandwidth the hunting packets could affect user traffic.

Hunting packets can be controlled through the use of policy restrictions, but this method requires some effort on the part of system administrators. Another method is through bridging. Bridging requires an additional memory associated with each link. When nodes on one side of the links send out hunting packets, the address of the source node is stored in the memory. When hunting packets arrive for that node, the bridging node forwards the hunting packets to the addressed node. Packets addressed to nodes not available through the links do not get forwarded. Because the method discussed is extremely simple, it can be made to operate in real time. Many other bridging techniques are known to those of skill in the art. Some of these methods can get quite complex and should be avoided, as the processing of hunting packets must be kept simple for proper operation.

It is important not to overuse bridging as its use can eliminate otherwise available path right-of-ways that can be useful during times of congestion.

Another application of bridging is the support of feeder nodes carrying outlying traffic to the main part of the network. As these outlying nodes generate hunting packets they are visible to the nodes interconnecting them to the main part of the network. These interconnecting nodes can use this information to filter hunting packets not intended for these outlying nodes. This greatly reduces hunting traffic going to the outlying nodes. Other schemes can invoke bridging only during peak busy hours to help reduce hunting packets at times of congestion. By the careful combining of bridging with policy constraints it is possible to reduce extra hunting packets yet keep the network operating at peak efficiency.

Packet segmentation is an optional service that can be invoked on some slower links to prevent long packets with a low COS from affecting the latency of packets with a higher COS. If a higher COS packet becomes ready to transmit while a node is transmitting a long, low COS packet, it can break or segment the low COS packet, transmit the high COS packet, and continue the low COS packet. The node simply sets the continuation bit at the end of a packet, and replicates the label from the original packet onto the continued packet. Layer 4 services at the receiving edge node buffers the first segment until the second segment arrives, reassembles the packet and forwards it to its final destination.

Figure 4:
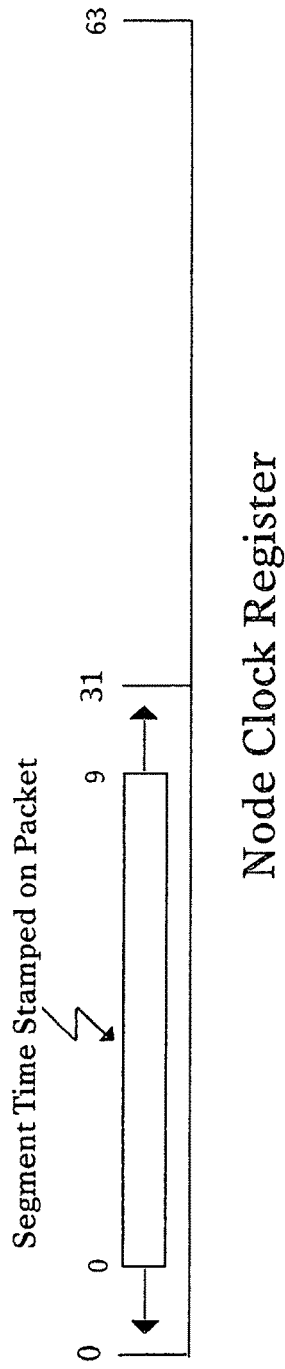
FIG. 4 shows how packet timing information used in establishing connections is transported throughout the network.

As has been mentioned in previously, all packets are time stamped. The time stamp field on each packet is considerably smaller than the stored time field at each node. In the case of the system disclosed in this document, the overall time field is a total of 64 bits long as it includes both time and date. Only 10 of the 64 bits are stamped onto each packet. FIG. 4 shows a representation of the segment in relation to the full 64-bit clock.

As the 10 bits are a small percentage of the total clock, it is clear that the choice of the 10-bit segment must be consistent with the expected latency of the packet flow. The segment must be chosen such that the maximum latency limit for a given packet flow is always smaller than the segment. As there can be many different packet types and each packet type can have different latencies, it is clear that the segment must be adjustable to match the packet flow being time stamped.

As latency is linked to COS for the system in this disclosure, COS data carried with hunting packets also defines which bits are stored for the 10-bit segment. It should be noted that the specification of this segment can be accomplished in many ways, and that one of skill in the art can specify other methods of efficiency coding this time segment.

Figure 5:
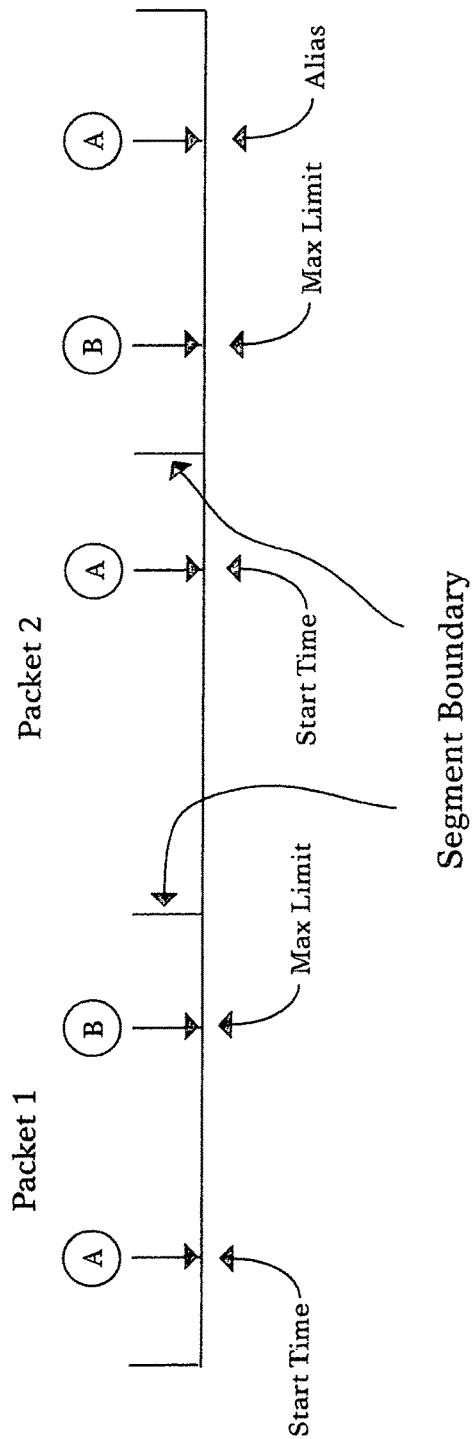
FIG. 5 is a timeline showing how packet timing information relates to segment boundaries.

As previously mentioned, the 10-bit segment must be defined such that both the start time and maximum latency can fit inside the segment. FIG. 5 shows the packet timeline including the start time and the maximum latency for 2 packets. Also, please note the alias points indicated on the drawing. As has been demonstrated in the Y2K experience, alias points occur when too few bits are used to describe an event.

By making sure the start time and the maximum latency are shorter than the segment, the alias points can be supported. Packet 1 shows a start time and the maximum latency both in the same segment. Packet 2 shows start and maximum latency points in different segments. Time stamped packets can have either situation. If the start time is defined as A, and the maximum latency is defined as B, the relationship between packet 1 and packet 2 is easily seen:
For Packet 1, B>A. For packet 2, A>B:
The alias point of A is greater than B as seen in FIG. 5.
For Packet 1, the region where a packet is valid is as follows:
Assuming X=the valid region and Y=invalid region, A≤X≤B. The invalid region is: B<Y, Y<A.
For Packet 2,
Valid: A≤X, X≤B Invalid: B<Y<A
Invalid user packet must be flagged or destroyed. Invalid hunting packets must be destroyed.
As is obvious to those of skill in the art, many of the previously discussed features are not needed for DNNs and should be removed to simplify and reduce the cost of a DNN.

Hardware

The model system disclosed in this document has been optimized around a large system that may be utilized by telecommunication carriers. Many different versions of this system can be implemented with this flexible architecture. Although a detailed hardware description is only shown for a switch fabric node, the same hardware design approach can be utilized for all the different node types encountered. The hardware design of the customer side of an edge node is known to those of skill in the art and will not be discussed at length in this document. Although the implementation is for a 10 Gig switch, this size can be scaled up or down as required.

Figure 6:
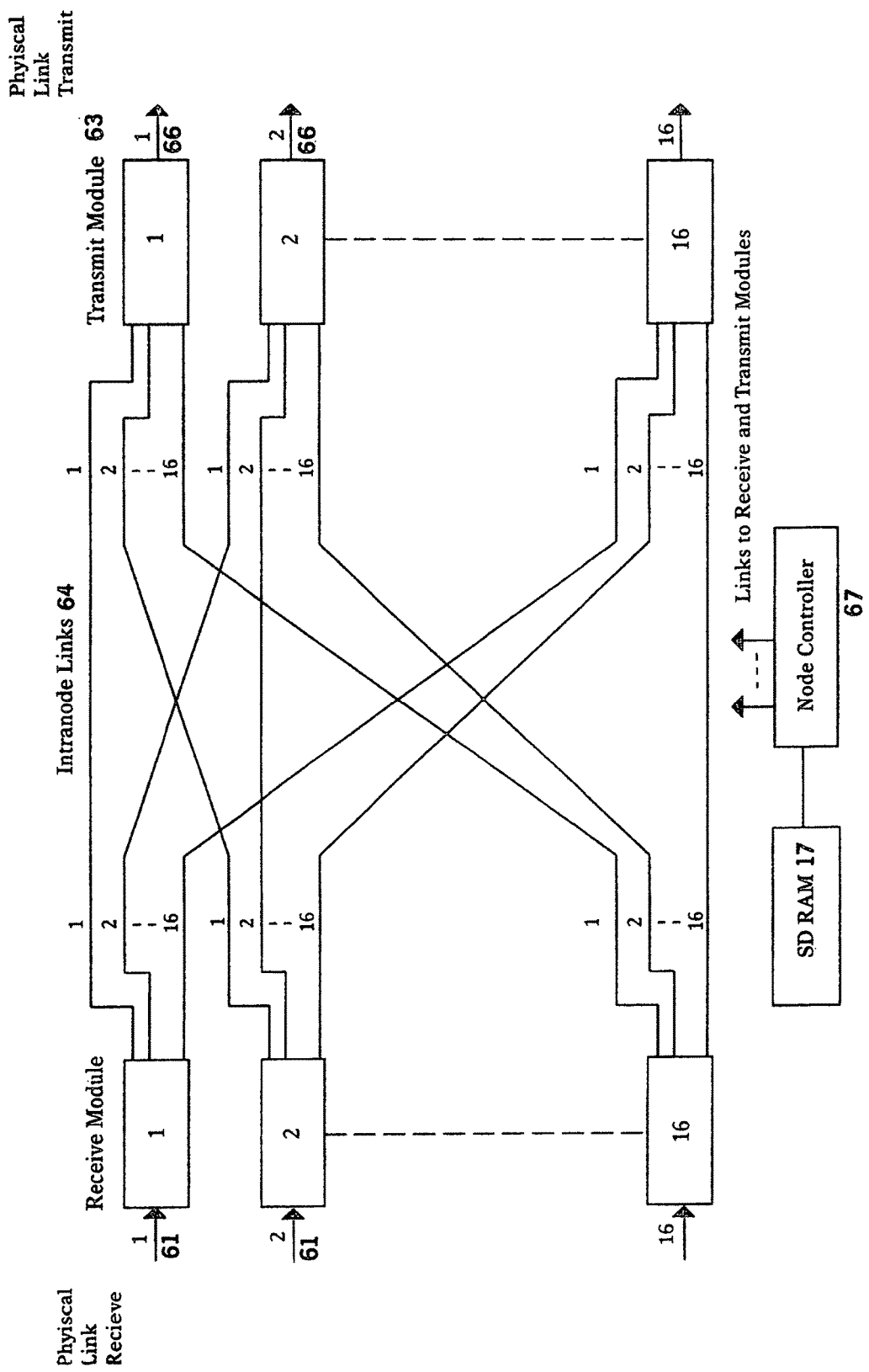
FIG. 6 is a system block diagram of a 16-port Switch Fabric Node.

The switch fabric node used in this model system is a 16 port by 10 Gig Ethernet version that contains an SD RAM 17 to support the initial installation. A drawing of this node is shown in FIG. 2. Because of the high speeds involved each port is self-contained and is connected to other ports via intranode links. A separate processor is shown for the transmit and receive functions provided for each port. An alternative approach is to combine transmit and receive functions on the same processor to simplify the design. The design in the model system assumes transmit and receive modules share the same memory. An alternative approach would be to use separate memory for each function, but this method would need a high-speed bi-directional link FIG. 6 shows a system level block diagram of switch fabric node. Receive inputs 61 from the adjacent nodes are shown on the left side of the drawing while transmit outputs 66 are shown on the right. These receive and transmit signals are actually processed together in a "PHY" chip not shown on the drawing. In addition, there are external components used to interface to the physical link such as fiber optics transceivers or transformers not shown.

The receive signal 61 enters the receive module 62 where it is processed and then retransmitted on one or more of the 16 intranode links 64. The link used to connect the receiver to its own transmitter is bi-directional and is only needed if the transmit and receive modules for the same port do not share the same memory. It is important to keep in mind that this document describes both options and shows both options in the drawings; but only one of these options will be chosen during implementation. The intranode links 64 provide a non-blocking, space division architecture. This switch is said to have a switching gain of 16 as one port can transmit to as many as 16 ports. From an external standpoint one input actually feeds 15 outputs as packet signals normally do not loop back upon themselves except when virtual nodes are involved. Because of the high speeds involved, the receive and transmit modules communicate with each other through an intranode link. The transmit module 63 accepts inputs from the 16 receive modules 62, buffers them and transmits the signals out to the physical links 66.

In addition to the receive and transmit modules, each node contains a processor 67 with an SD RAM 17. This processor 67, called node controller, in the drawing, is used to manage system wide functions such as OA&M support, key distribution and time management. The removable SD RAM 17 can be used to provide initial setup functions such as security keys, node name or number, etc. The processor 67 communicates with each of the modules through special links going between each module and the processor.

Figure 7:
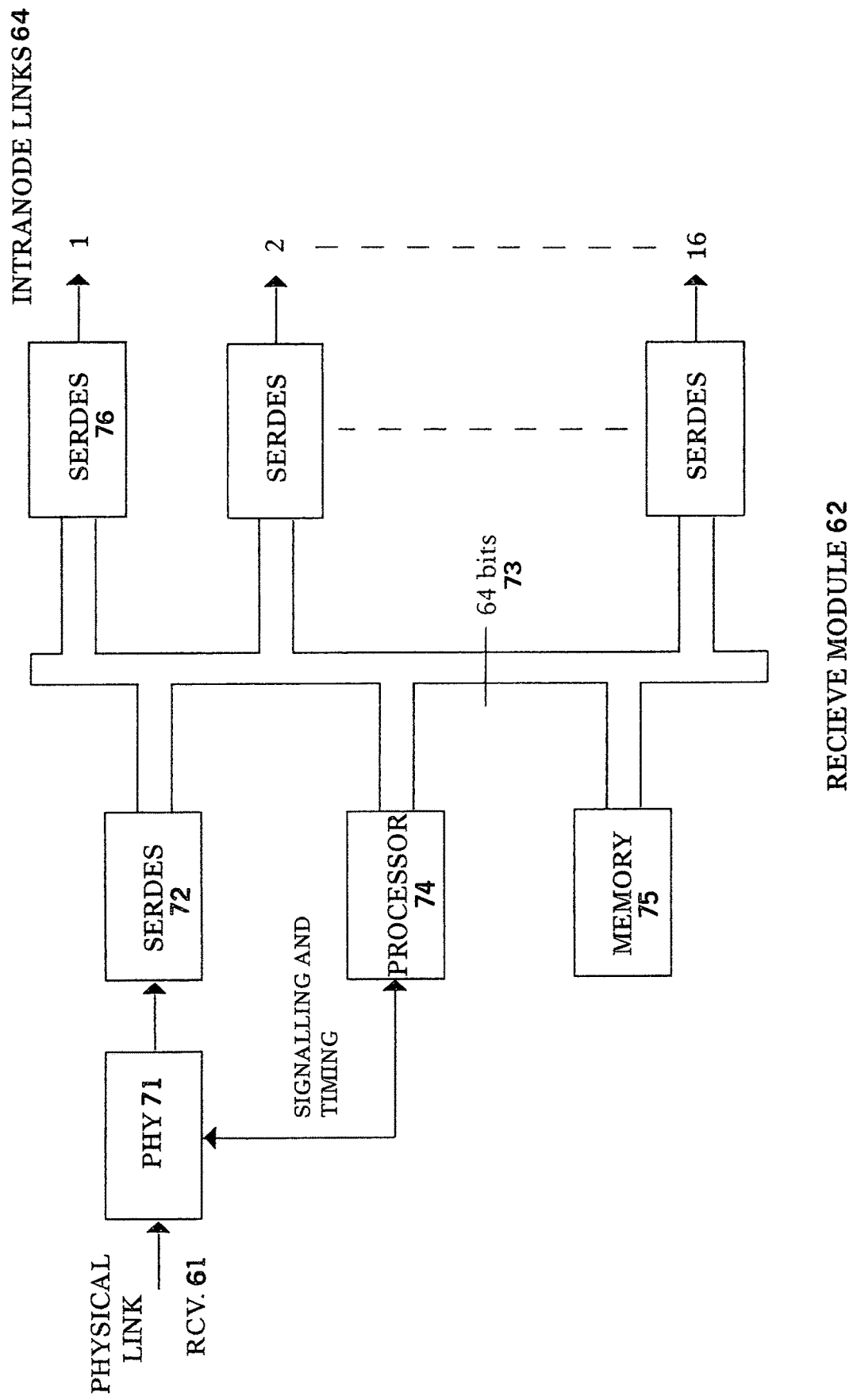
FIG. 7 is a block diagram of the Receive Module of FIG. 6.

FIG. 7 shows a block diagram of the receive module 62. Signals from the link 61 enter the PHY chip 71 where all the layer 1 functions such as clock recovery and framing are supported. Management of the PHY chip 71 is provided through the receive and transmit processor. The processors also support Layer 2 functions for each link. The decoded signals from the PHY chip next enter the SERDES chip 72. The SERDES chip 72 provides the conversion from the serial link signals to a parallel interface compatible with the processor and memory connected to each link. SERDES and other high speed chips are available from companies such as Broadcom. How to design with these components is known to those of skill in the art.

The SERDES chips 72 are connected to a 64-bit backplane 73 that is also connected to the processor 74 and memory 75. The 64-bit backplane 73 was chosen to allow all key parameters used in label translation to be stored in one word. It was also chosen to allow the processor 74 to have more real time to perform the reads, writes, compares and other simple arithmetic functions on the packets flowing through the links. The processor 74 receives a packet from the SERDES 72 connected to the link receive port, modifies the packet, and sends it on to one or more of the transmit SERDES chips 76 where the packet is converted to a serial bit stream and transmitted over the intranode links 64

Figure 8:
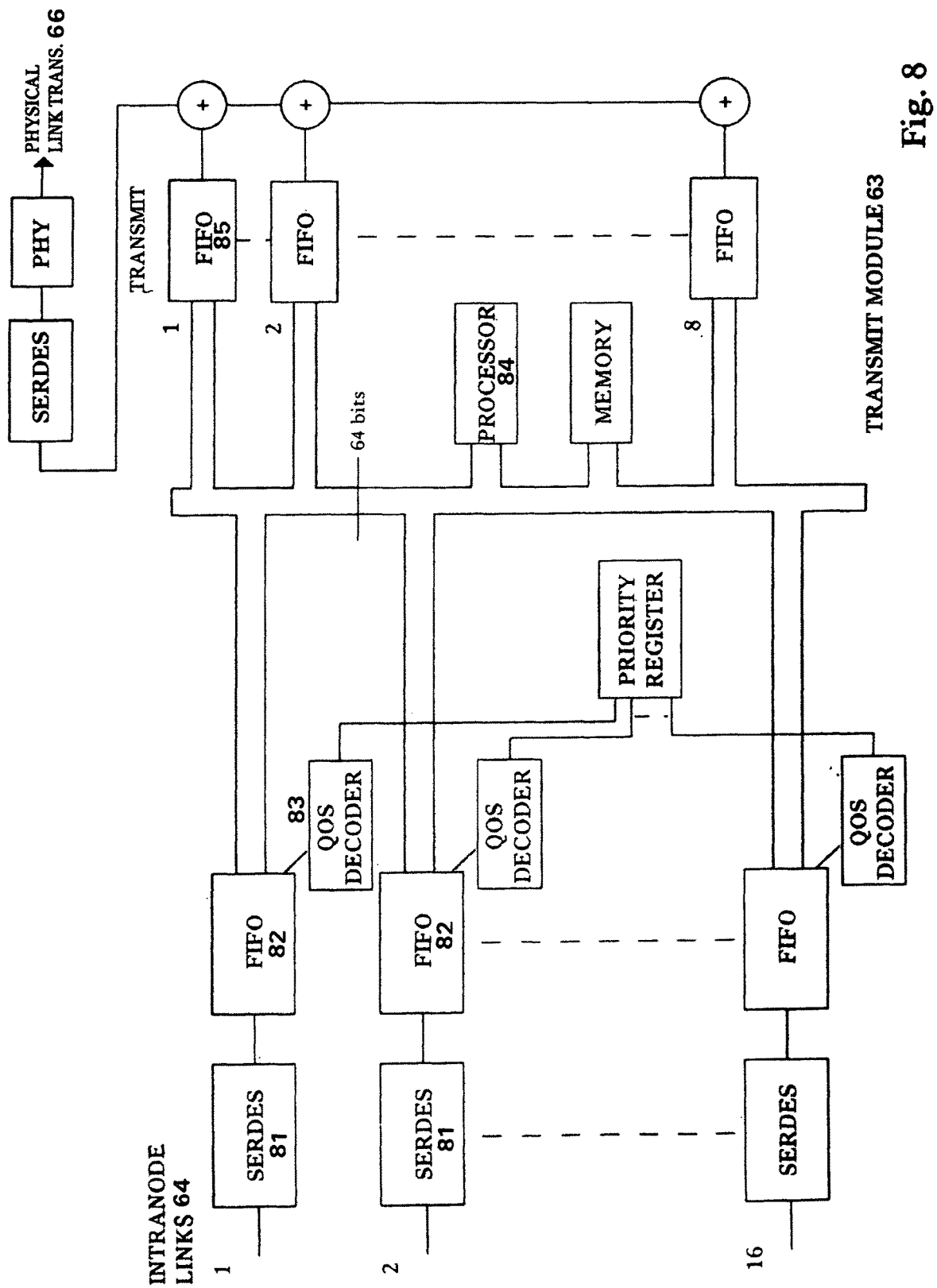
FIG. 8 is a block diagram of the Transmit Module of FIG. 6.

FIG. 8 shows the transmit module 63. The transmit module receives the packets on the intranode links 64, processes them, and transmits them out to the next node. Packets from the intranode link 64 are received at the SERDES 81 and converted to parallel. The packets are then stored in a FIFO (First In, First Out) register 82 where they are buffered. A QOS decoder 83 examines the QOS bits associated with each packet and provides a means to identify and select the higher order packets for priority transmission. The processor 84 moves packets based on priority from the intranode FIFOs 82 to the transmit FIFOs 85. The drawing shows 8 output FIFOs that represent 8 output queues. In a commercial design, the number of queues is likely to be much greater.

Although the queues are shown in physical form, they may be implemented through the processor with special memory management software.

Figure 30:
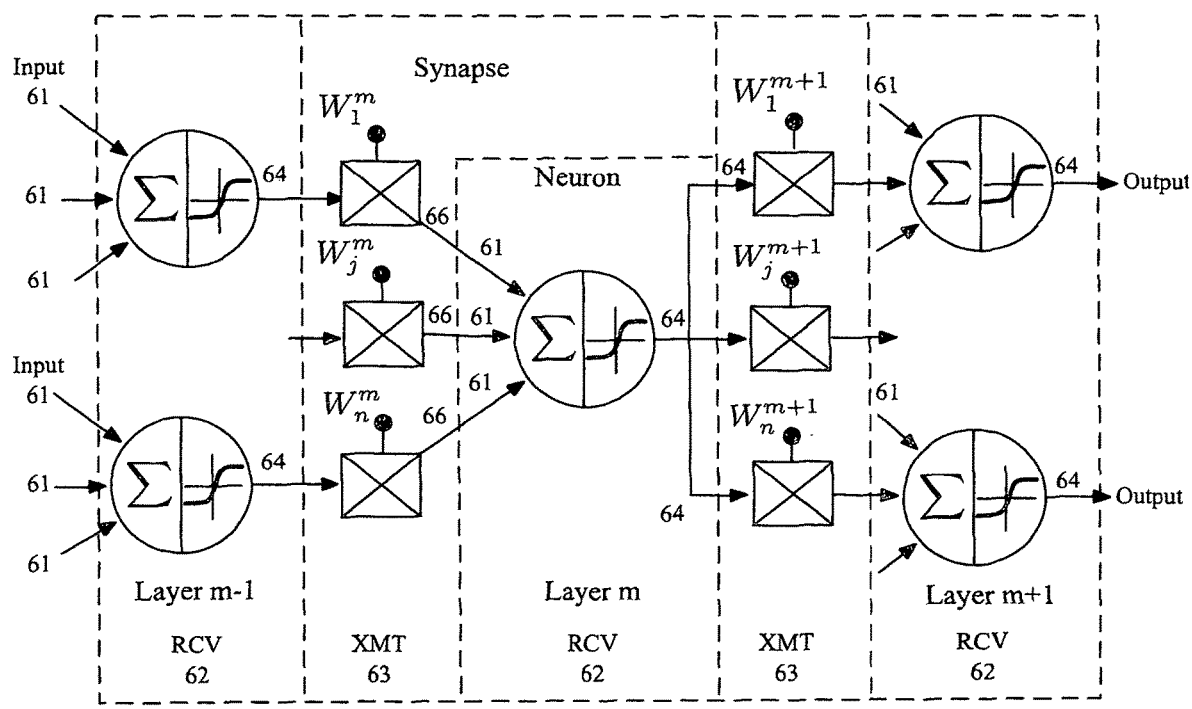
FIG. 30 is a schematic of data neurons implemented using SRP RCV 62, and SRP XMT 63, which are part of switch fabric node of FIG. 6.

The key to understanding the DNN is the understanding of the data neuron. The data neuron is a switch fabric node 14 of FIG. 6. The node is comprised of a receive module 62 and a transmit module 63 interconnected by intranode links 64. Although the node only shows 16 ports, it has many more connection points as each LSP can be considered a connection point. The transmit and receive modules are interconnected as shown in FIG. 30. FIG. 30 is derived from FIG. 3 on page 15 of reference 2. The dashed lines were added to show the implementation of the neural network using switch fabric nodes. Each bank of interconnections (the dashed lines) can be considered a layer. Neural networks contain many layers to provide intelligence. From FIG. 30, the neuron is the receive module 62, and the synapse is the transmit module 63. The synapse provides the weight function "w" which is provided using the packet waiting function which is part of the transmit module. The neuron (RCV 62) is actually connected to many inputs (LSPs) and either passes or blocks the signals. When the signal is passed it appears on the intranode links 64, and connects to many other neurons through the synapse (XMT 63) which adds the weights (delays).

Figure 32:
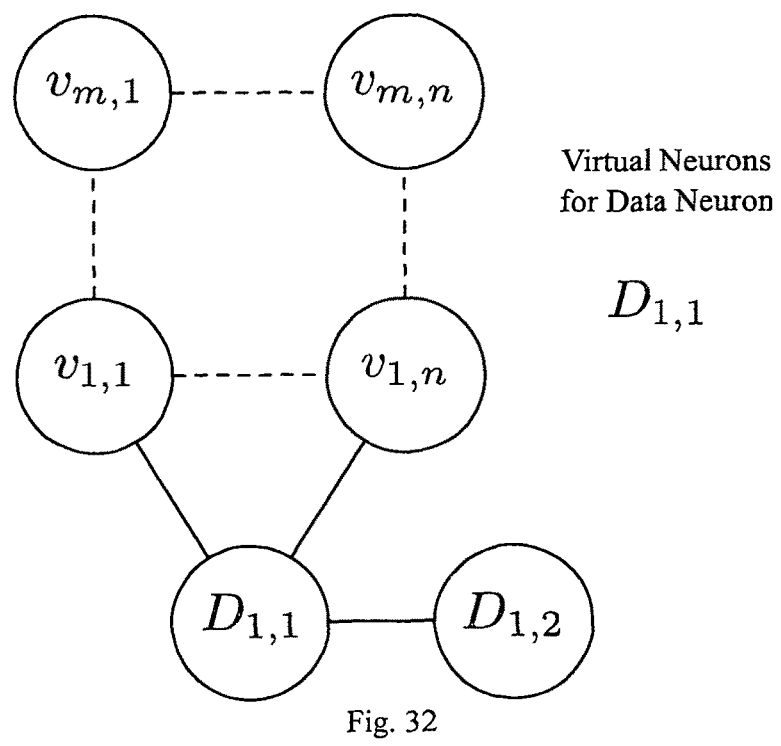
FIG. 32 illustrates the relationship between data neurons and virtual neurons.

The data neuron can be comprised of many virtual neurons. FIG. 32 shows a data neuron, $D_{1,1}$, and virtual neurons $v_{1,1} \ldots v_{min}$. Each virtual neuron has access to only a portion of the 20-bit address associated with each link. When a data neuron receives a packet from an external link, the data neuron can determine which virtual neuron is to receive the packet. The data neuron then assumes the identity of the virtual neuron, and processes the packet. Virtual links exist between the virtual neurons that are part of a given data neuron.

Virtual neurons interface to each other and to the host data neuron using virtual ports. FIG. 6 shows a system block diagram of a switch fabric node. When this node is used as a data neuron, only a subset of the 16 ports are used to interconnect with other nodes that would be part of the array of FIG. 31. Unused ports can be used as virtual ports by connecting input 61 to output 66. When a packet leaves transmit node 63, it arrives on receive node 62 which now acts as a virtual neuron.

Each virtual link includes weights (delays) to regulate the flow of packets within a given data neuron. The processor in the data neuron must be fast enough to support all the virtual neurons included in that data neuron.

It is important to understand that the implementation of this neural network is hardware based for simplicity. The neuron implementation can be achieved using software running on a processor. In many cases the number of the signaling bits can be changed, and some of the hardware elements of FIG. 6 can be removed to make the design more efficient. These trade-offs are well known to those of skill in the art.

The transmit module can be a source of congestion as 16 10-Gig links feed into one 10-Gig link.

To limit possible congestion it is necessary to eliminate extra hunting packets as early as possible in the design. When a hunting packet is received, its PSN must be communicated to all ports as soon as possible to prevent unnecessary hunting packet replication. When hunting packets arrive at virtually the same time on more than one port, it is not possible for the transmit module to communicate with the receive modules in time to prevent replicated packets from arriving at the transmit module. It is for these reasons the transmit module must be able to process hunting packets fast enough to prevent blocking.

Software

FIGS. 9-16 provide the flow charts of each primary activity occurring in the network. In addition, FIGS. 20-28 provide data structures showing the data that must be transferred between nodes or stored on each node to achieve proper operation. Each operation will now be discussed:

User packets require the least amount of system resources to transport.

Figure 9:
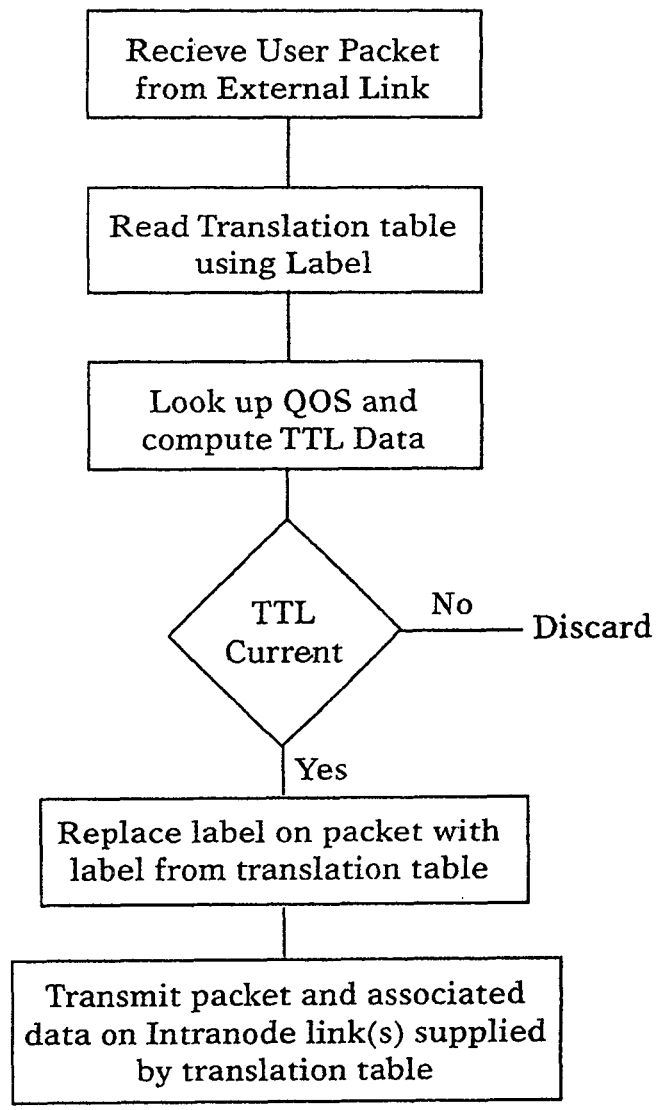
FIG. 9 is a flowchart showing how a User Packet progresses through the Receive Module (FIG. 7).
Figure 10:
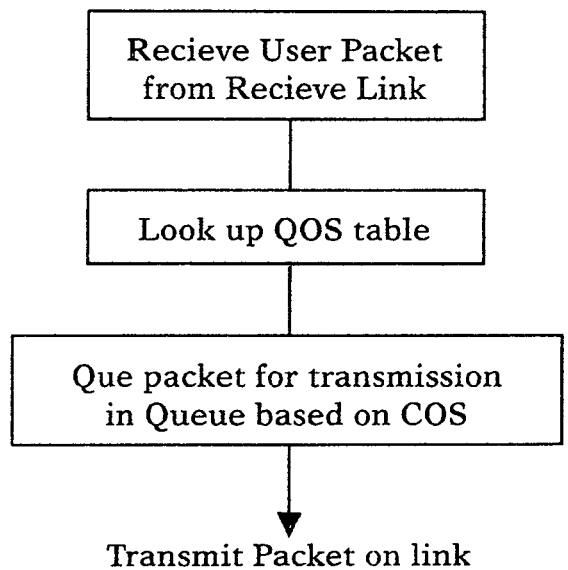
FIG. 10 is a flowchart showing how a User Packet progresses through the Transmit Module (FIG. 8).
Figure 17:
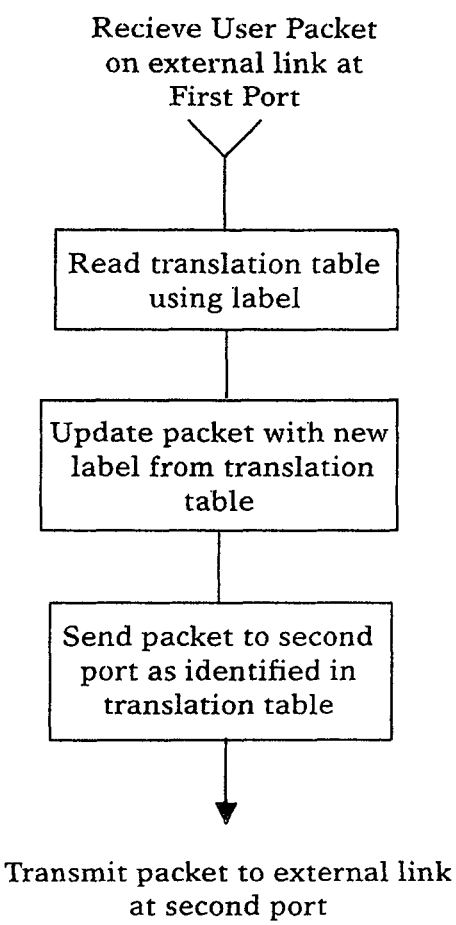
FIG. 17 is a simplified flowchart of a User Packet progressing through a node including the label translation.

FIG. 9 shows the receive module. This module receives the packet, checks Time To Live (TTL) data to ensure the packet is current, translates the label, and sends the packet to the transmit module. FIG. 10 shows that the transmit module queues the packet for transmission to the next node based on COS. FIG. 20 shows that the user packet only needs the label and the TTL data making it very efficient for transporting small payloads. The translation table of FIG. 24 shows that the new label, QOS, TTL, and the output port address, are all the data that must be stored. FIG. 17 shows a simplified flow chart for reference.

Figure 11:
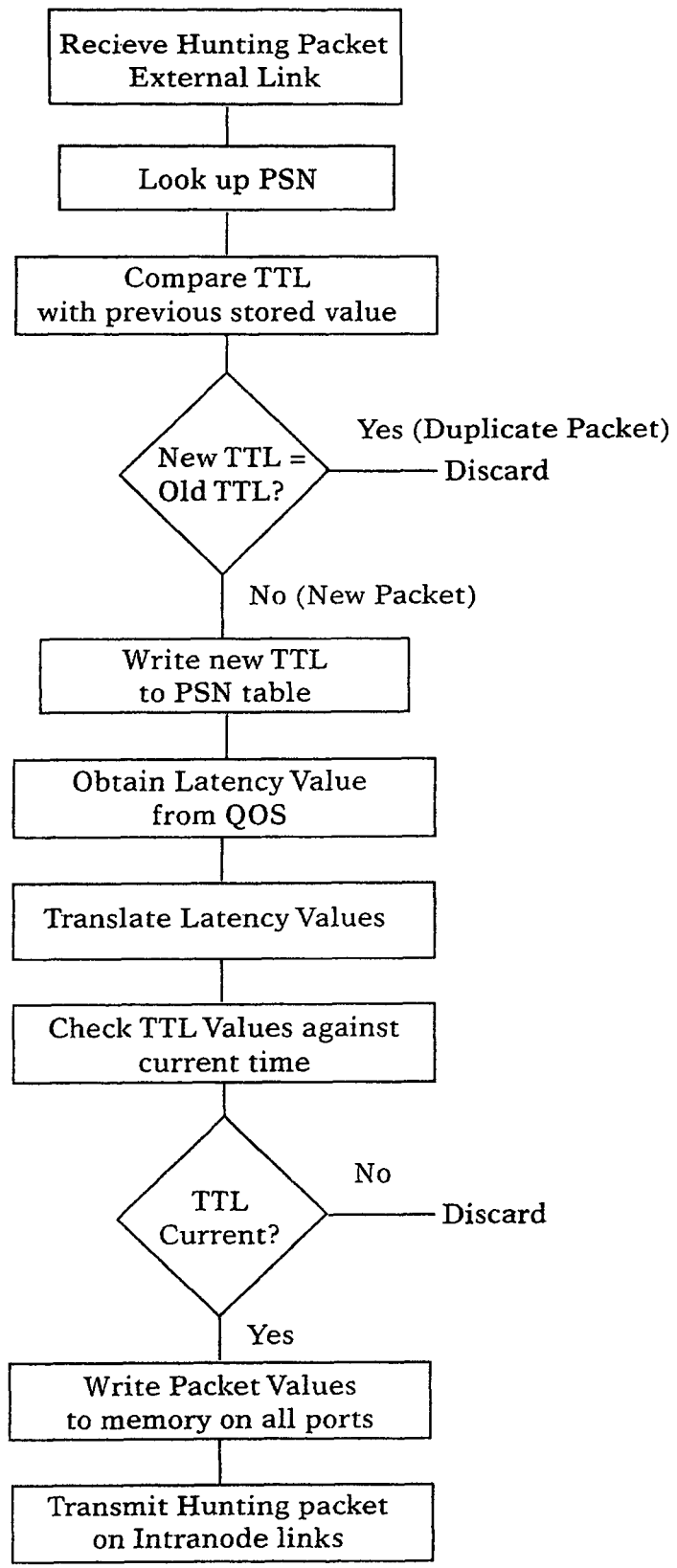
FIG. 11 is a flowchart of a Hunting Packet progressing through the Receive Module (FIG. 7).
Figure 12:
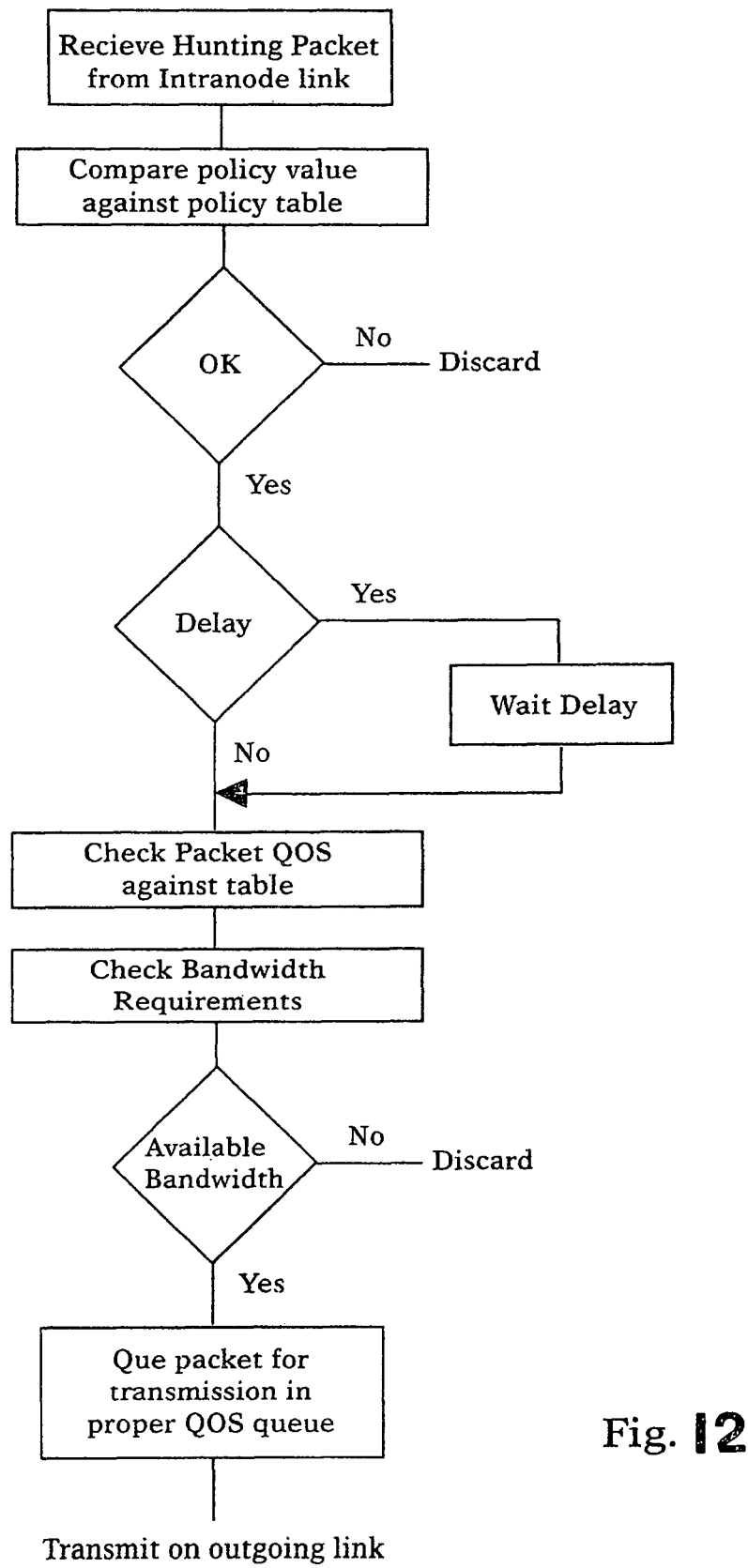
FIG. 12 is a flowchart of a Hunting Packet progressing through the Transmit Module (FIG. 8).

FIG. 11 shows the hunting packet. The receive module checks the hunting packet for duplicates, checks that it is current, and forwards it to the output ports. FIG. 12 shows that the transmit module looks up policy information and may delay or even discard the packet depending on policy rules. Available bandwidth for the packet COS is checked, and if o.k., the packet is queued for transmit.

FIG. 21 shows that the hunting packet uses the PSN as a label, and needs to carry TTL, QOS, policy, receive and transmit node numbers, and peak and average bandwidth data. Optional fields are available for additional data strings for hunting through more complex environments such as multicasting, neural network functions, interdomain hunts, or hunts for names such as domain names, etc. Also extra space is shown for the transport of keys for encrypted networks. Secure networks can require keys to build a path to anything of concern.

An alternative method of using hunting packets to build a label-switched path is as follows:

Instead of storing the port number on each node traversed by the hunting packet as referenced by the PSN, the method is to store the port number on the hunting packet itself. As the hunting packet traverses the network it collects an ordered list of the ports. The list is then used to build an LSP from the called computer back to the calling computer. Alternatively, the node address could be used in lieu of the port number. Source routing is then used to build the LSP between the destination computer and the source computer. These methods work well when the number of nodes traversed by the LSP is kept relatively short, but can become a problem when the number of nodes is high due to the growing size of the hunting packet.

These alternative methods are useful when the available memory on each node is limited. The ordered list of nodes used for the LSP between the source and the destination can be useful when solving complex math problems such as the traveling salesman problem.

Figure 13:
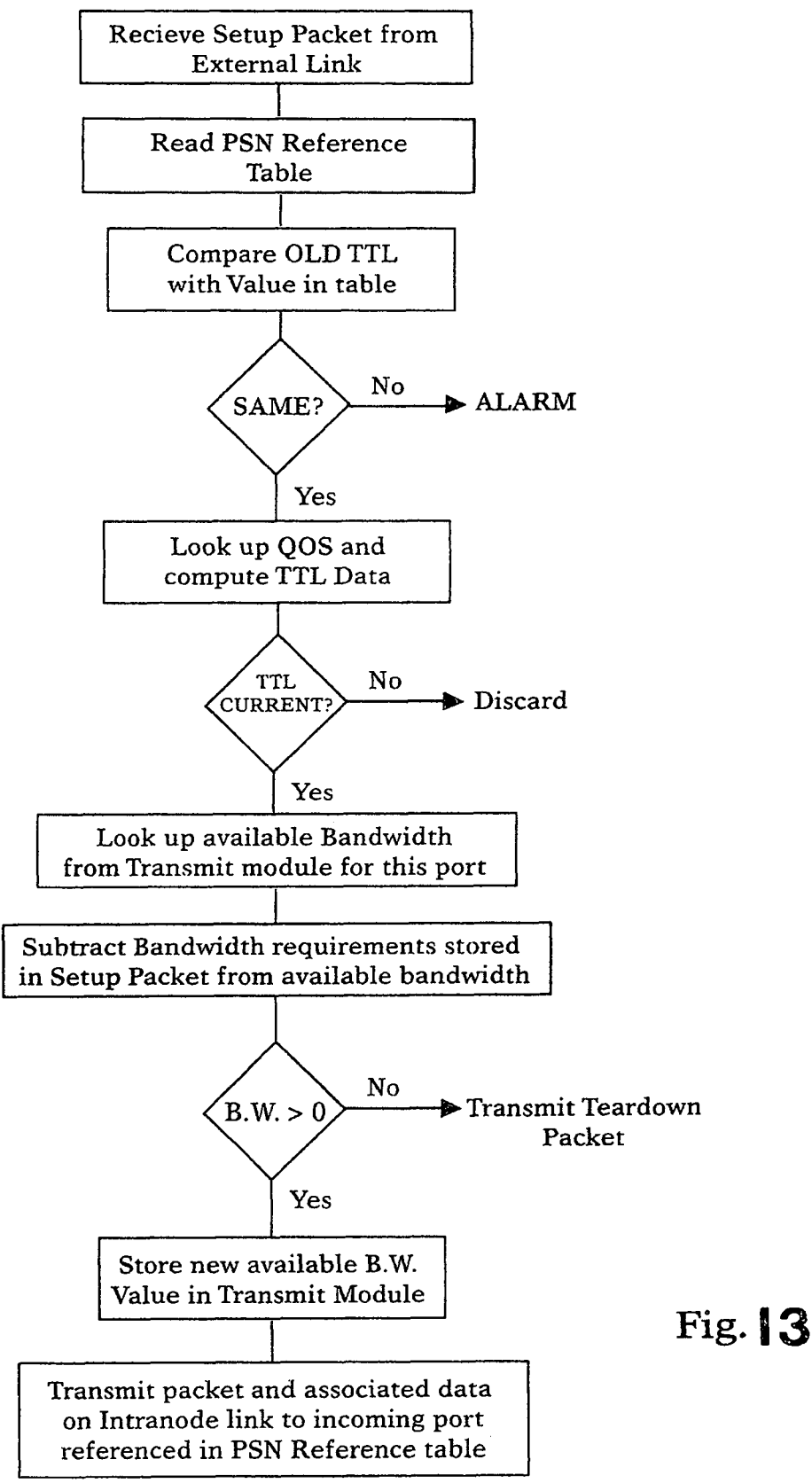
FIG. 13 is a flowchart of a Setup Packet progressing through the Receive Module (FIG. 7).

FIG. 13 shows the receive module software for the setup packet. As this packet flows through the network in the reverse direction it is important to keep in mind that the transport portion of the receive port is really what is being programmed.

Figure 14:
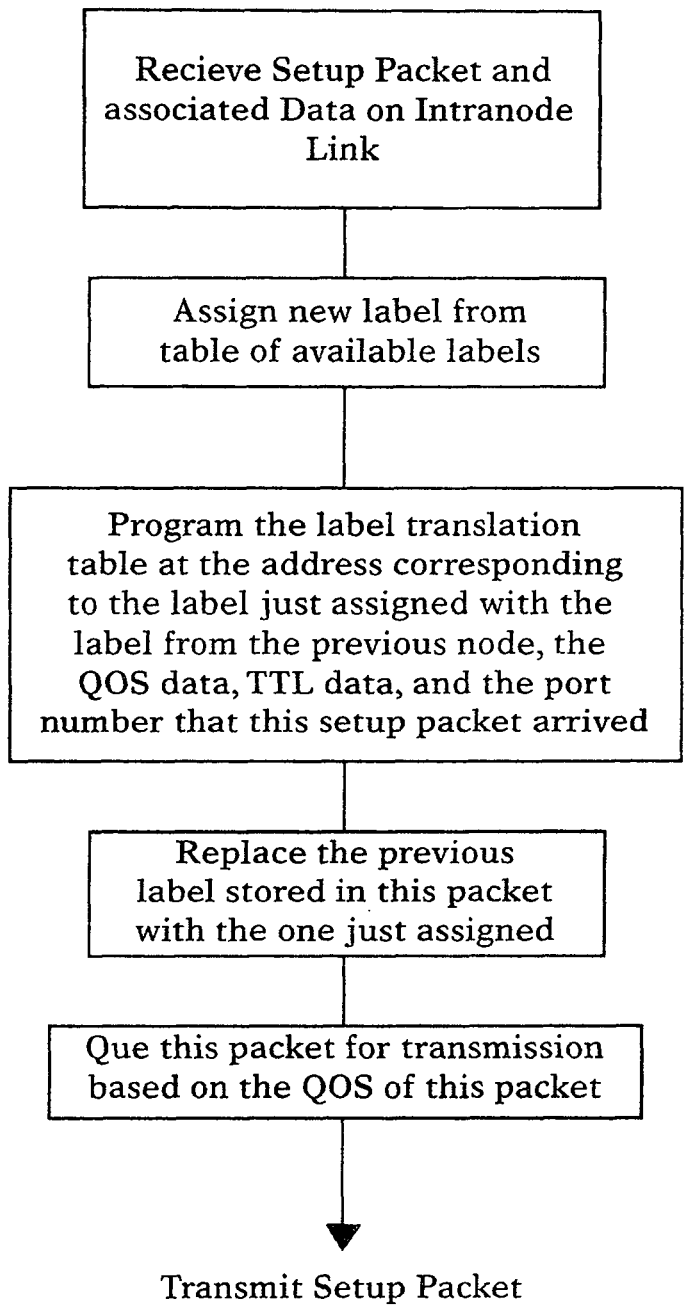
FIG. 14 is a flowchart of a Setup Packet progressing through the Transmit Module (FIG. 8).
Figure 15:
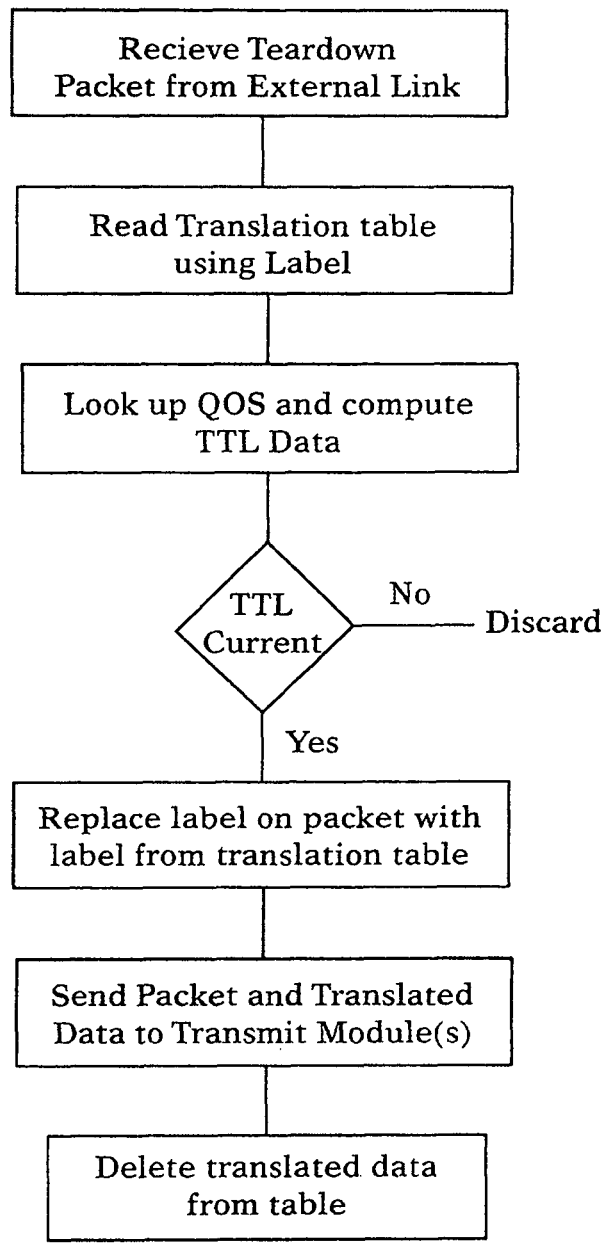
FIG. 15 is a flowchart of a Teardown Packet progressing through the Receive Module (FIG. 7).

The checking of the available bandwidth is a transmit function but must be done through the receive portion of the module. Once bandwidth checking is finished, the packet can move to the transmit module (FIG. 14). Again, this module will be programming the connected receive side as both receive and transmit sections of the same port reside together. The label translation table, which is actually on the receive portion, is programmed at this point.

The setup packet is shown on FIG. 22. The PSN is shown for this address. The PSN is the same PSN of the hunting packet that built the right-of-way. This packet merely follows that right of way back to the transmit node. The TTL is checked to ensure the packet is current. The old TTL is used to provide a match with the hunting packet stored in the PSN reference table. This value must match, or the path will not be built. QOS and Policy are stored from the previous hunting packet and are used to ensure proper setup. Peak and average bandwidth is used as part of the check that the transmit link has sufficient bandwidth to support the packet flow. The setup packet also stores the label provided by the previous node. This label is programmed into the Label Translation Table of this node. This node will select a new label that this packet will transport to the next node.

It is important to keep in mind that when setup packets are used as part of a DNN, that much of the checking may not be necessary as the DNN platform is less likely to be transporting user packets.

Figure 16:
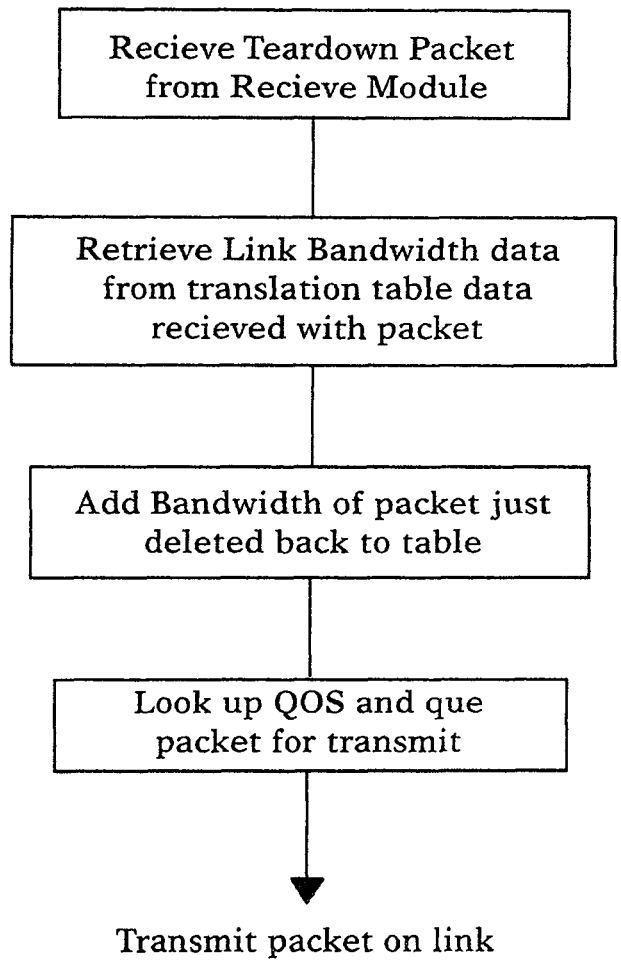
FIG. 16 is a flowchart of a Teardown Packet progressing through the Transmit Module (FIG. 8).

The teardown packet (FIG. 15) looks much like a user packet in the way it traverses the receive portion of the node with the exception that it deletes the translation data from the table as it leaves. In FIG. 16, it can be seen that it adds the bandwidth back to the transmit bandwidth table. FIG. 23 shows the teardown packet. The only additional information transported is the failed node indicator. This information is used to indicate the failure point in the system for future repair. This node is the originator of the teardown packet.

It should be noted in this embodiment, there is a total of 6 flags that travel with the packets. These 6 flags tell each node how to process each packet. These flags are indicated at FIG. 23.

System Design Issues

The previous section briefly discussed the flags that are used as part of the system. These flags are used to support fast and efficient processing of the packets by guiding the system to the proper translation tables.

As mentioned previously, to support bidirectional LSPs it is necessary to have two label translation tables per port. The translation tables are shown in FIGS. 24 and 26. Operation is made simpler if these two tables can reside on the same port. When they reside on the same port, available space on the reverse label translation table can be used to store Peak/Average Bandwidth requirements. This data is used when a teardown packet removes an LSP. Operation is simplified when the forward translation table can be moved to the transmit module. This can be accomplished if a table called "Output Port Flag Table" is added (FIG. 28). This table allows user packets entering the receive module to be passed to the transmit module by pointing the packet to the proper transmit module without translating the label.

A user packet can be branched by using a branching table in conjunction with the label translation table. The branching table shown in FIG. 27 can be support up to 3 outputs at one node. By moving the label translation table to the transmit module and using the output flags table in FIG. 28, branching can be increased up to 16 ports. (A 16 port node would only branch up to 15 ports.)

The Flag Table would be programmed when a setup packet moves to the transmit module. The packet would simply set a flag as it moves through the module on its way to the next node. The flag would indicate which port the setup packet entered the node. If branching was allowed, one of the flags shown in FIG. 104 would be set for that purpose. Flag V (shown as reserved) would be assigned to allow branching. Each additional setup packet carrying the same PSN would set an additional flag on the flag table (FIG. 28) and branching would occur.

Hunting in its simplest form uses the 16-bit node number as the hunt object. FIG. 3 shows a network with called party 02. This party, also called the receiving or terminating node (as it receives or terminates the packet flow), simply responds to a match in the 16-bit RCV Node address. The hunting process can be more complex when the hunt object is not just a node but a longer string of characters. In this case, the "Request Code" or "Info Request" sections of the hunting packet would be used. A hunt may be to a key word or phrase which may be recognized by an interested server (a server looking for the word) as in an Information Centric Network.

In some cases, an edge node or Junctor would need to use hash tables to do recognition of longer bit strings. In this case, the Junctors may have to cache certain LSPs for external linking to other Domains. Interdomain hunts may involve longer waits as a hunt to a Junctor could in turn trigger an additional hunt through an adjacent domain.

Hunts can occur through multiple Junctors. If branching is allowed (multicasting), the path right-of-ways may branch either before or after the Junctors depending on which path is shortest. If the hunt is for a single called party in a different domain, the setup packet can flow through any of the Junctors back to the calling party.

When a hunt is to a bank of servers, multiple responses can occur as each server may respond to the request independently. In this case, the first setup packet to arrive at the calling party will receive the connection. The remaining LSPs will be blocked at the point they attempt to branch to the connection. These partial LSPs will be torn down and the servers will be notified that they did not obtain the connection. Optionally, multiple servers may respond and be branched into a point to multipoint connection.

DNN Platform Functionality Layers

The functionality of DNNs for problem solving can be broken down into layers:

The lowest layer is the physical layer that contains data neurons (switch fabric nodes). The data neuron can be implemented with simple logic sufficient to perform the neuron function, or it can be a microprocessor that adds additional functionality. The data neuron can be combined with a sensor such as an electromagnetic sensor that is capable of sensing light or other forms of electromagnetic radiation, or a mechanical (pressure), or an acoustic sensor.

Figure 31:
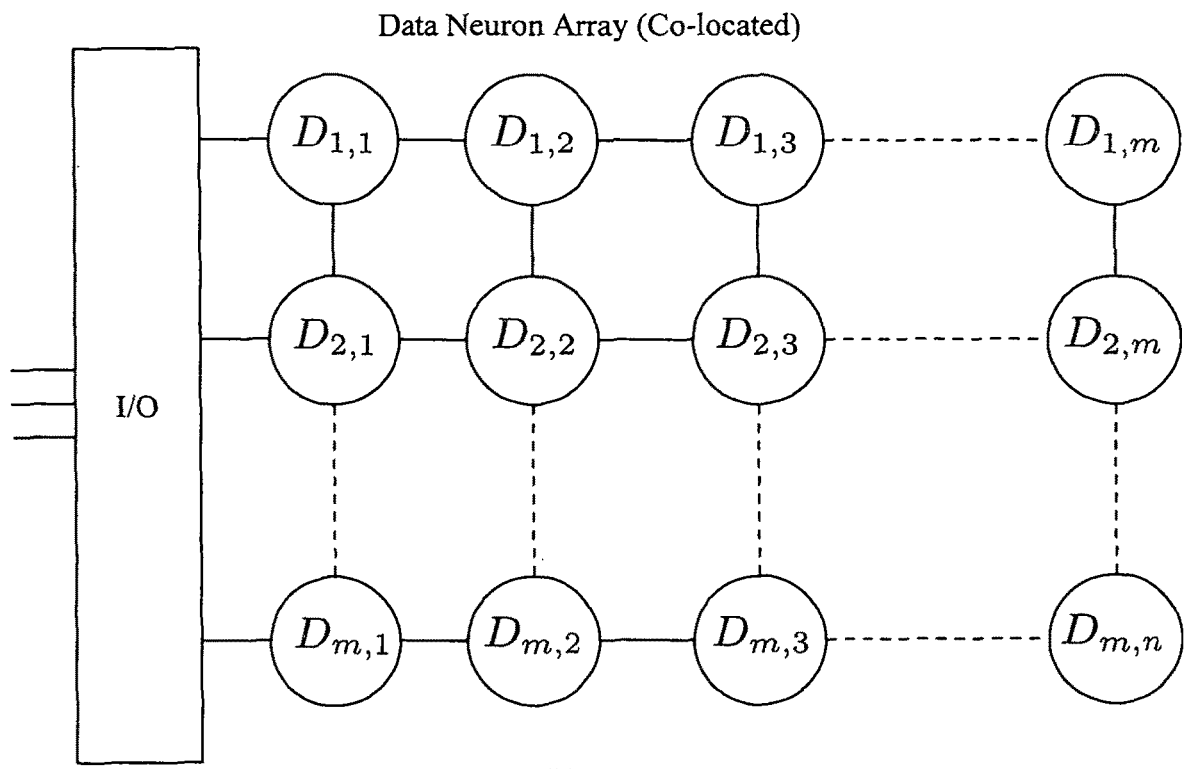
FIG. 31 is a data neuron array co-located on a PCB or semiconductor substrate.

The data neurons can be connected together via links. The links can be external, as in a typical data network, or the links can be internal such as would be seen if the data neurons were part of an array on a single semiconductor substrate. FIG. 31 shows a typical substrate containing an array of data neurons, $D_{1,1} \ldots D_{m,n}$. If part of an array, the adjacent nodes would be connected together inside the substrate.

The second layer involves the interconnection of the data neurons. To achieve DNN functionality, it must be possible to interconnect any given data neuron to other related data neuron for the desired network topology. This interconnection is implemented through the establishment of LSPs between selected data neurons. This method has been previously discussed.

The third layer involves the normalization of the LSPs between the data neurons. The normalization is performed by adding sufficient delay to each path between the selected data neurons such that a fixed equal delay exists between each data neuron needed for the problem. This step is necessary as the propagation delay between data neurons may not be equal as it can vary depending on the physical location of each data neuron. Delays between neurons on a substrate and those external can vary greatly. After the network is normalized, the DNN is now ready to solve complex problems. In some cases it is possible to combine this step with the weight assignment discussed in the next layer.

The fourth layer involves the setup of the DNN for problem solving. When the DNN is set up as an array, it will be necessary to map the points or objects of a physical representation of the problem, onto the data neurons.

Although the data neurons may be in a form of a two-dimensional array, it is possible to add other dimensions, or to greatly increase the size of the array through the use of the previously discussed virtual neurons. The array must be of sufficient size to accommodate all the points or objects in the problem. Problems can have a large number of objects, and each object must map onto a specific data neuron. When the array is larger than the number of objects, it can be considered as a grid with each intersection point a data neuron. A common technique is to "snap" the objects to the grid. In order for the objects to be snapped to the grid, they must first be put into a form where their relationship can easily be displayed, such as in terms of co-ordinates (x,y,z). Once in this form, the objects can be mapped to the DNN. Large complex objects can be expressed as several data neurons linked together with no delay in between. Previously collected data can now be written to each data neuron. The data can be information relating to each node, or can be the relationships between nodes. Relationships can be physical, such as time or distance, can be mathematical, or can be subjective.

Once snapped, the links are added between the objects. The links are in the form of LSPs, and can traverse multiple nodes. Weights are added to each link to express the relationship between the two objects connected by the link. If not already in time, the weights are converted to a time delay value that is stored in a memory associated with the link.

The fifth layer involves the solving of the problem. This layer can be initialized only after the previous four layers have been completed. The fifth layer requires the running of one or more hunts. The hunt is usually triggered by a request made of the network to identify a path through the array. As the path is identified, information is stored. Typical information may include the number objects (nodes) traversed, the order of the objects, or the total time to traverse.

There are two types of hunts that could be encountered. The linear hunt is the most common. The purpose of the linear hunt is to discover an optimized path between a source and a destination. (previously discussed). The second type is the recursive hunt. In this hunt, specific nodes must be traversed, but the order that the nodes are traversed may be the variable to be solved. For example, the order can be changed to minimize the total time used. Also, additional nodes may be traversed to reduce total time elapsed. This functionality is known to those of skill in the art, and is used for solving a traveling salesman problem. This type of problem is discussed on page 32 of reference 1 (Fig. A5). Other types of problems solved using neural networks are seen in Fig. A.

The best way to understand this novel architecture is by example: If one wanted to move men or material between locations called terminals (or nodes of the corresponding DNN) on airplanes, trains, or trucks (links), the system would operate as follows: The source would transmit a hunting packet toward the destination. The hunting packet would travel over links following each pathway through intermediate points such as airports, train stations, or freight depots with delays added based on weather conditions, cost, travel time, congestion, etc. Each terminal would check its available resources and then forward the hunting packet to the next terminal. TTL information would be taken into account. Once the hunting packet arrives at the destination, the destination would either accept or ignore the request based on its capabilities. The destination may receive multiple hunting packets, each with slightly different metrics. Once an acceptable hunting packet is received, the destination would transmit a setup packet into the network. This packet would perform the function of buying tickets, booking flights, reserving space, etc. as the packet travels back to the source. When the setup packet arrives at the source, it would contain the information necessary for shipment.

There are many advantages to this type of functionality. Each terminal (node) manages its own resources independently without knowledge of the other terminals. Congested terminals simply ignore hunting packets. Delays (weights) can be added independently by third parties so they are out of the control by the managers of the terminals. The optimum route is always chosen as each terminal in the path has its say along the route. As the data follows the same pathways as the cargo, changes and updates can be made instantly without the need of third parties getting involved. Changes can be made on the fly taking into account weather, equipment failures, etc. Finally, the link established using the setup packet traverses all the required terminals between the source and the destination providing a method for any of the terminals along the way to provide instant updates on the shipment. Also, the link is secure as it cannot be accessed by those other than the parties directly involved.

Another advantage is the interconnection of terminals can take place over traditional IP networks. Paths can be fashioned out of any available medium including VPNs on IP. As paths on VPNs tend to be slower and less efficient than LSPs, delays must be scaled up to take into account latency variations.

Automatic, Secure Operation

The OSI layer 4 network of this invention can be considered fundamentally secure for the following reasons: This network communicates at layer 4, directly below the session layer used by computers to communicate, so the user's computers have direct network control for making connections. Prior art networks are layer 3, meaning there is a gap in the OSI layers that can be exploited by the hackers to give them access to the target computers via their IP addresses. Through these IP addresses, the hackers can identify weaknesses in the target's network. With this access the hackers simply hammer the target computer until they break in. As the IP address is known, hackers can institute a denial of service (DoS) attack overwhelming the target. With this layer 4 network, the hackers have no access to the target computer unless the target computer agrees. In other words, the hacker would have to know unavailable information about the target, and would need to convince the network to make the connection to the target, and get the target to accept the connection. For that to happen, the hacker would have to know unavailable information about the target such as its name or security codes to convince it to accept the connection. Using policy constraints, the hackers could be completely locked out from secure locations, even if the hackers knew all the required information. If this neural network functionality is needed to operate on an IP network, it would be necessary to add additional security such as additional keys, or an encrypted VPN to prevent hackers from accessing the neural network. To isolate the network from hacked computers it may be necessary to use a separate box from the user's computer to deny the hacker access to the network logic.

The DNN of FIG. 1 is designed to operate automatically and securely, with teaching provided through the OA&M terminals 13 that incorporate the capabilities of the switch fabric nodes 14. Because of the importance of the OA&M terminals, it is necessary to keep them secure and separate from the Internet. Access needs to be limited to prevent physical access by hackers or unhappy employees. The OA&M terminals run software that automatically supports policy and QOS for the domain. Policy or QOS support can also come from the other nodes in the domain, but needs to be separated to ensure that the policy setting occurs independently from the path selection. Data neurons, as well as external computers, can generate or receive hunting packets, giving the system the ability to operate independently from external factors such as human intervention or security threats. Other human interfaces can be provided in lieu of the OA&M terminals, such as optical or acoustic sensors and actuators, for better human interaction. Each of the following network functions need to operate independently to ensure network security:

Path setup and teardown
Policy setup and distribution
QOS control
TTL assignment When these four functions operate independently, the network can operate automatically and securely, and not be affected by any single threat.

Robotics

The DNN architecture is well suited for robotics as data can be collected through the sensors, passed to the processing portion, and converted to commands which are transmitted to the actuators. Communication would be through the aforementioned human interface.

An important advantage of this neural network is that it is designed around the management of packet flows. Data from sensors flows through the network to a control point. Monitoring of this data is best seen by example: If a sensor produced packets proportional to pressure, in other words: the higher the pressure, the greater the bandwidth, the network would be able to sense the activity through the packet flow bandwidth. The network would now be able set thresholds and monitor activity directly. When a packet flow exceeded a set threshold the affected neurons in the network would respond to correct the condition by rebuilding the connection. Network instability can be intentionally created to cause network changes. The network would then need to utilize resources to return the network to stability. This functionality can be called direct network stimulation as these packet flows directly stimulate the network into making changes. Stimulation of this type can be thought of as causing discomfort or pain to the network. In effect, the network can be taught to feel and react to pain. Sensing pain is an important tool for self learning and is especially valuable in robotics.

Sensor Networks

SRP Network technology is well suited for sensor networks as the sensors can be setup as in the Robotics section.

Information Centric Networks

Content Centric Networks

An excellent application for the previously discussed SRP Network technology is supporting Information Centric Networks (ICN) and Content Centric Networks (CCN). One of skill in the art can easily see that the Hunting Packet can carry the Key Word used to locate available information from a server. The network would operate as follows:

A user would initiate a hunt for a Key Word. The Hunting Packet would arrive at one or more servers. If the server was interested, it would accept the connection request. When one or more servers accepted the request, a point to multipoint connection (branching) would be formed. More information would be requested by the user which would flow through the point to multipoint connection just established. When a server lost interest, it would transmit a Teardown Packet which would remove it from the connection. At some later stage in the process, a server could transmit data or follow-on questions back to the user.

A network of this type is totally secure as the user has no knowledge of the servers and vice versa. Data transmitted by one server is not seen by the other servers. Large amounts of data can be transmitted anonymously and securely as only the involved nodes have any knowledge of the connection that traverses that node. As a layer 4 connection is established, the only latency seen is the latency due to distance.

Power Grid Control

An important application for a neural network is in the control of the power grid. The power grid (also called the Smart Grid, or the Electrical Grid) is a complex network used to control our electrical system. The Forbes patent (Reference 3) shows an example of a possible computer based control of this complex network. Some requirements of this network are listed below:

1. Precise time alignment between power sources (generators) to allow phase adjustment.
2. Fast reliable communication to correct for changes in sources or loads.
3. The ability to rebalance quickly when new sources or loads appear.
4. The ability to drop certain loads in times of stress.
5. No single points of failure.
6. Network security to prevent hacking.
7. Seamless, secure interconnection of multiple utility companies.
8. Easily add sources, loads, or switching points to the grid.
9. Ease of control by the Power Grid Authority using Administrative Terminals.

One of skill in the art can easily see that each of these requirements has been previously addressed in this application. Associating a data neuron with each grid element such as a generator or a substation will allow the neurons to collect information and pass it through the network. Associating delay with power levels or losses provides a method for the neural network to balance power loading at each connection point as the weighting associated with the delay will allow the network to select optimized transmission paths. Associating delay with losses through the power transmission lines interconnecting the grid elements provides a means to adjust these additive losses for minimum total loss across the grid.

It is now important to review the detailed operation of a neural network in the power grid: FIG. 1 of this application shows a neural network in the power grid. Power sources would connect to the grid neural network via Edge Nodes 11. Loads provided by Utility Companies would connect through different Edge Nodes 11. Switching points (substations) would connect to corresponding Switch Fabric Nodes 14. The links between nodes 14 would correspond to power transmission lines. Delay would be added to nodes 14 to model losses in the associated transmission lines. Administration Terminals 13 would be used by the Power Grid Authority to manage the neural network. The power grid is shown as Domain 1 with the nodes interconnected together to model the actual grid. Interconnection between power grids is shown as connections through Junctors 15.

A request from a Utility Company for power would flow through the neural network associated with the grid to the power sources. The sources would respond to the request if they had available power. The response would flow back through the neural network associated with the grid to the Utility. The Utility would then accept the offer which would build a connection through the switching points to the source. The actual connection over the grid is modeled precisely via the DNN so that changes in load, temperature, power availability can be adjusted instantly prior to any actual power switching on the grid. Additional neurons would be added to the neural network as required to model more complex interactions such as load shedding and solar/wind power generation.

There are some issues with the Forbes patent:

First, the interconnection network shown in Reference 3 (FIG. 22, and Col. 14, Lines 10-14) uses an IP network, leaving the power grid control system vulnerable to hacking. The power grid has become a prime target for sabotage and must be protected to ensure stability of our nation. The neural network of this application can be easily hardened through the techniques previously discussed. To ensure security, each computer connected to the neural network must not also be connected to other networks as the external connection can be used by hackers.

Second, the concept of turning off power to residences has recently come under fire due to an event where PG&E turned off power to large areas to reduce the possibility of fires. This event caused panic and confusion including loss of life to the affected communities and has sparked a backlash against intentional power interruptions by utilities. The smart grid concept relies on being able to shut off power during periods of high demand and now needs to be rethought in light of these recent events.

Simplified Explanation of Path Acquisition and Setup

Figure 18:
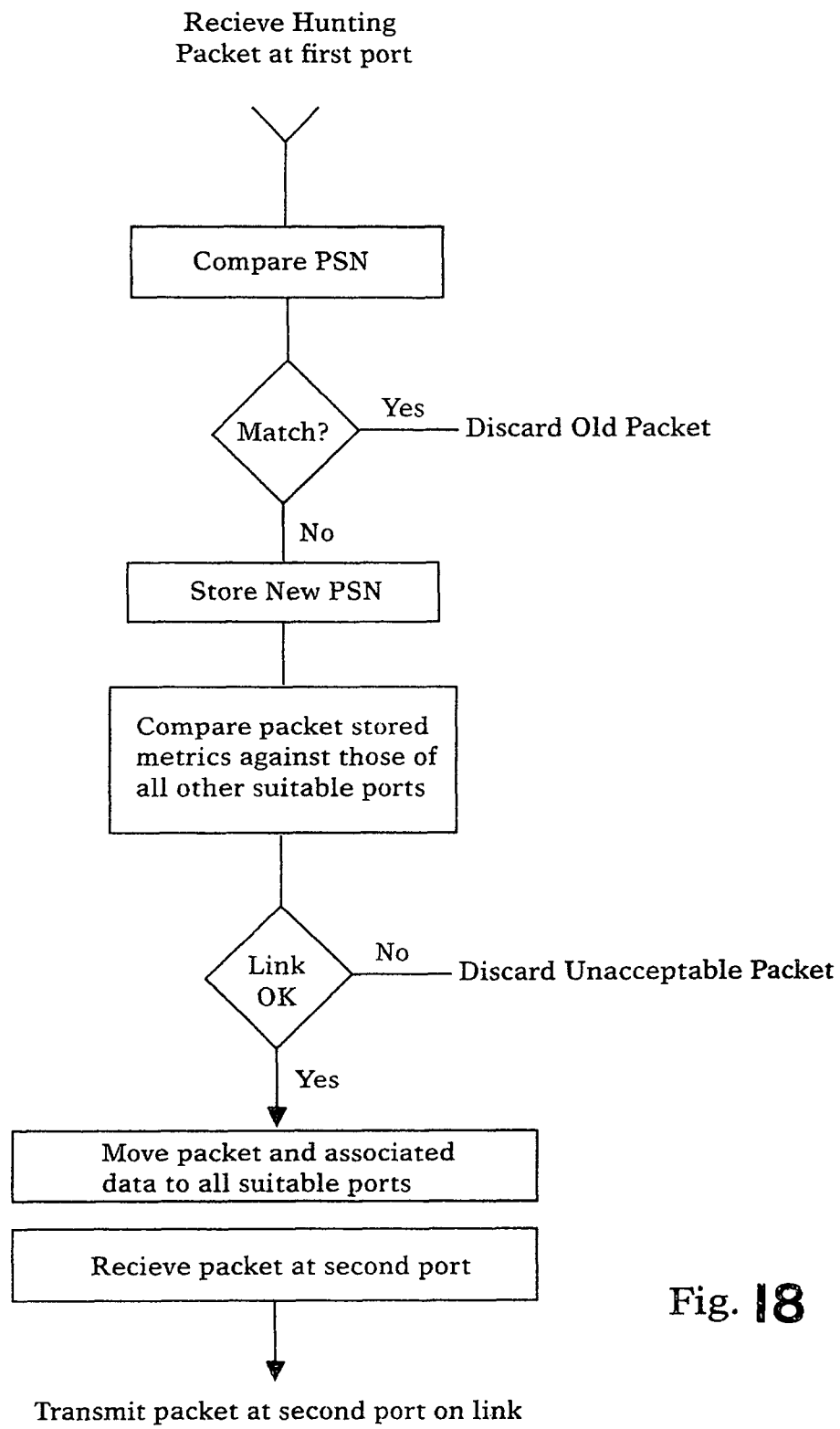
FIG. 18 is a simplified flowchart of a Hunting Packet progressing through a node including PSN checking.
Figure 19:
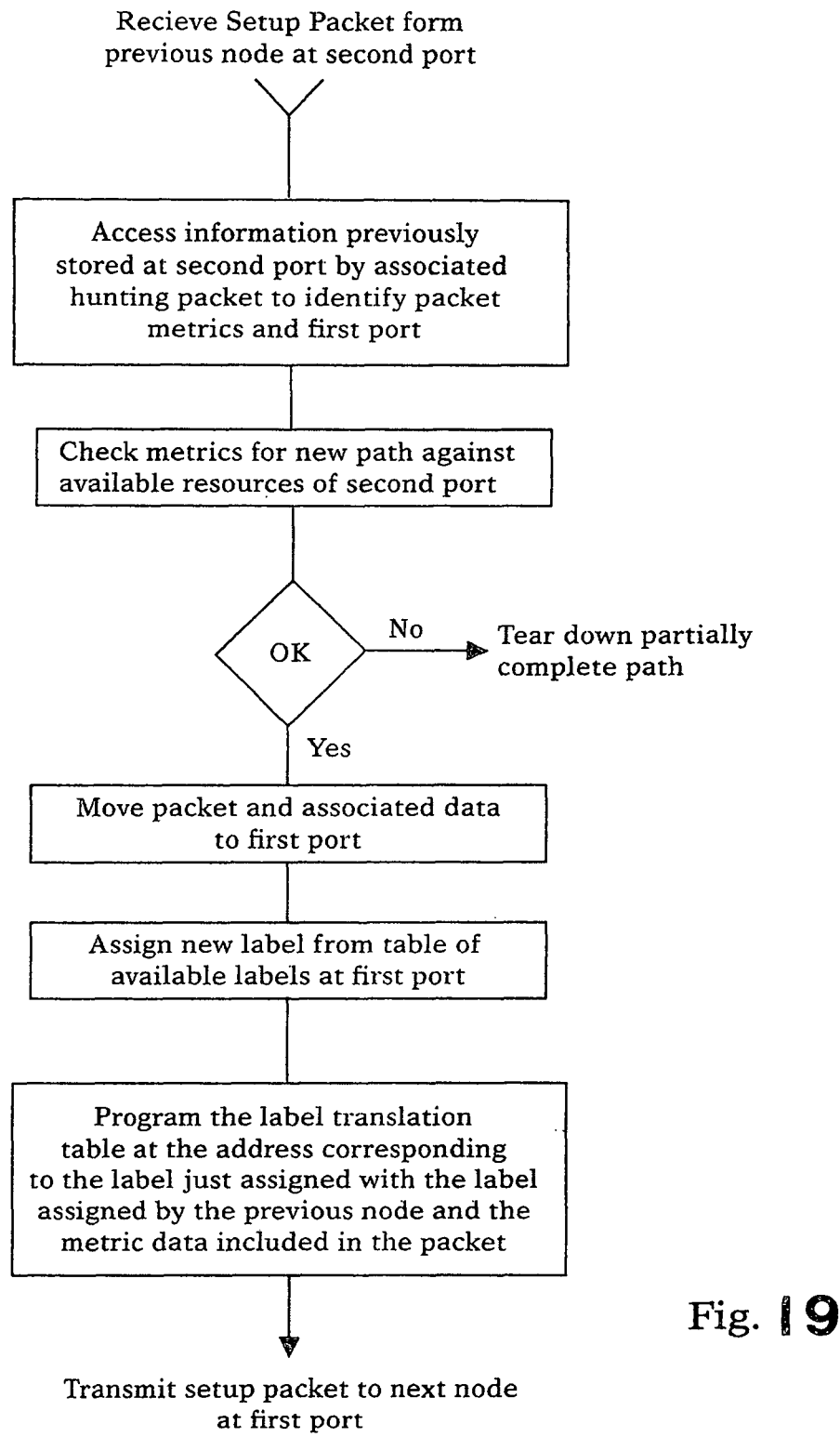
FIG. 19 is a simplified flowchart of a Setup Packet progressing through a node including the programming of the label translation table.
Figure 29:
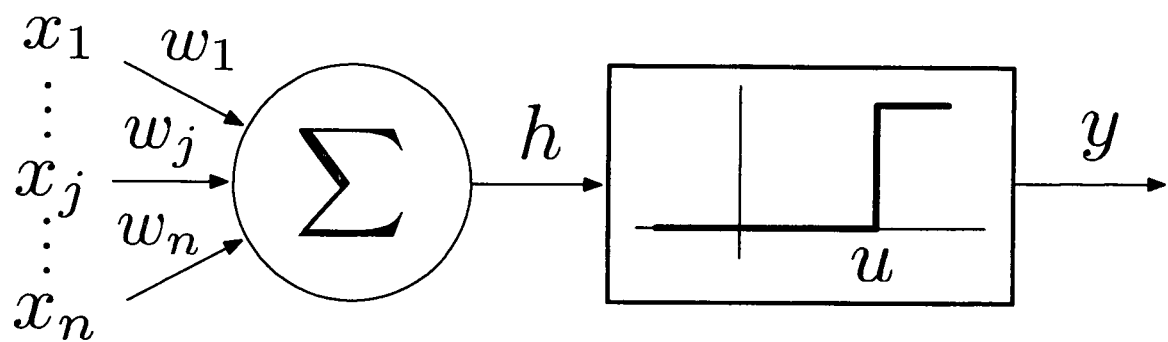
FIG. 29 is a drawing of the McCulloch-Pitts model of a neuron and the corresponding mathematical expression.

A packet is received by an edge node. No current path exists so the originating edge node builds a hunting packet. This packet contains an address that the terminating node can respond to. The packet also contains metric information to identify minimum requirements for QOS for the path to the terminating node. The hunting packet is transmitted into the network. The adjacent node receives the hunting packet and checks the packet serial number (PSN), a unique number assigned by the originating edge node (FIG. 18). If the number was previously stored, the packet is a duplicate and is destroyed. If the number is new to the node, it is stored. Once checked, the packet is then transmitted on all the ports compatible with the metrics stored on the hunting packet. This action continues through the network until the hunting packet arrives at the terminating node. At this point, the hunting packet has exposed a path right-of-way from the originating node to the terminating node. The terminating node builds a setup packet using the information, including PSN and metrics from the hunting packet, assigns a label from a table of available labels, and transmits the packet back down the link that the hunting packet arrived. The setup packet is transmitted to the first adjacent node on the path right-of-way FIG. 19). The node receives the packet, looks up data stored against the PSN of said hunting packet including the port address that the hunting packet arrived, and metrics.

The node checks the metrics against the port availability. If the port can support the packet flow identified by the hunting packet, the node will assign a label from a table of available labels. The node will then build a label translation table with the newly assigned label as the address and the label included in the setup packet as part of the data stored. The data stored in the table will also include the port address that the setup packet arrived, along with the QOS from the hunting packet. The first adjacent node then transmits the setup packet out the same port that the hunting packet arrived. The setup packet will continue down the path right-of-way all the way back to the originating node. The final step is the originating node is provided a label to the newly created LSP to the target node. Not only was the path created automatically at wire speed, but it was the most optimum path available subject to required metrics of the packet flow.

Although the system and method taught in this embodiment is of a large layer 4 MPLS type packet network, the methods taught in this invention apply to any network with multiple nodes including Information or Content Centric Networks. It will be obvious to one of skill in the art that this invention can be practiced to expose and program an optimum path through communication networks including optical, ad-hoc, wireless or satellite networks, especially as these networks have nodes that move around and may not be available at all times. The methods taught in this invention can be used to program and manage any data routing device with multiple ports or radio channels to provide optimized paths for packet flows. Although this invention uses label switching, it will be obvious to those of skill in the art that the methods taught here can be applied to other data networks including those networks with fixed addresses such as radio communication networks, or IP networks.

These approaches can be used to program large and small voice and data networks where a choice among multiple options must be performed. The methods taught in this invention correct a deficiency in today's data networks relating to multicasting as no method that is practical and efficient has been available for building multicasting LSPs in MPLS, Frame Relay, or ATM networks today.

The invention claimed is:
1. A neural network of nodes associated with grid elements of an electric power grid comprising:
   edge nodes of the neural network associated with power sources and power loads of the electric power grid, where the nodes contain software or circuitry to connect them with their corresponding grid elements;

switch fabric nodes associated with each electrical switching point of the power grid, where the nodes contain software or circuitry to connect them with their corresponding switching points;

the aforementioned nodes with software or circuitry capable of receiving or measuring losses associated with the high voltage transmission lines used to interconnect the corresponding grid elements, and to convert these losses to weights used in the neural network.

2. The nodes of the neural network of claim 1 further capable of receiving requests from associated grid elements, and transporting them across the network to selected edge nodes.

3. The nodes of the neural network of claim 2 containing software or circuitry capable of introducing a delay in data transported, where the delay functions as a weight value for the corresponding nodes of the neural network.

4. The nodes of the neural network of claim 2 where the nodes do not rely on the use of an IP address.

5. A method of interconnecting grid elements to control an electric power grid via a neural network comprising:

associating and connecting each power source and power load of the power grid with edge nodes of the neural network;

associating and connecting each power switching point of the power grid with a switch fabric node of the neural network;

establishing a data link corresponding to each high voltage transmission line interconnecting the switching points with each other and to the sources and loads, where the loss of each line is assigned a weight for the corresponding node of the neural network.

6. The method of claim 5 where the nodes receive requests from corresponding grid elements and transport them across the grid to other grid elements.

7. The method of claim 6 where the weight function is achieved through the addition of delay in the transport of data across the neural network.

8. The method of claim 6 where neural network does not rely on the use of an IP address.

* * * * *